US008818025B2

(12) United States Patent
Salminen et al.

(10) Patent No.: US 8,818,025 B2
(45) Date of Patent: Aug. 26, 2014

(54) METHOD AND APPARATUS FOR RECOGNIZING OBJECTS IN MEDIA CONTENT

(75) Inventors: Ilkka Tapani Salminen, Tampere (FI); Mikko Antero Nurmi, Tampere (FI)

(73) Assignee: Nokia Corporation, Espoo (FI)

( * ) Notice: Subject to any disclaimer, the term of this patent is extended or adjusted under 35 U.S.C. 154(b) by 342 days.

(21) Appl. No.: 12/861,603

(22) Filed: Aug. 23, 2010

(65) Prior Publication Data

US 2012/0045093 A1 Feb. 23, 2012

(51) Int. Cl.
*G06K 9/00* (2006.01)
(52) U.S. Cl.
USPC .......................................... 382/103; 348/169
(58) Field of Classification Search
USPC ......... 382/100, 103, 104, 115, 116, 117, 118, 382/181, 190, 195, 206; 348/169–172
See application file for complete search history.

(56) References Cited

U.S. PATENT DOCUMENTS

| 5,774,591 | A  | * | 6/1998  | Black et al. ................... | 382/236 |
| 6,985,620 | B2 | * | 1/2006  | Sawhney et al. .............. | 382/154 |
| 7,152,786 | B2 |   | 12/2006 | Brundage et al. |  |
| 7,315,631 | B1 | * | 1/2008  | Corcoran et al. ............ | 382/118 |
| 7,447,331 | B2 | * | 11/2008 | Brown et al. ................. | 382/103 |
| 7,460,695 | B2 | * | 12/2008 | Steinberg et al. ............ | 382/118 |
| 8,023,726 | B2 | * | 9/2011  | Sundaresan et al. ......... | 382/154 |
| 2003/0133599 | A1 | * | 7/2003 | Tian et al. ..................... | 382/118 |
| 2004/0236575 | A1 |   | 11/2004 | Goronzy et al. |  |
| 2008/0317346 | A1 |   | 12/2008 | Taub |  |
| 2009/0103887 | A1 | * | 4/2009 | Choi et al. ...................... | 386/52 |
| 2009/0248415 | A1 |   | 10/2009 | Jablokov et al. |  |
| 2009/0280859 | A1 |   | 11/2009 | Bergh |  |
| 2009/0326945 | A1 |   | 12/2009 | Tian |  |
| 2011/0164147 | A1 |   | 7/2011  | Takahashi et al. |  |

FOREIGN PATENT DOCUMENTS

| EP | 1 509 042 A1 | 2/2005 |
| EP | 1 998 556 A1 | 12/2008 |
| JP | 2011-097576 A | 5/2011 |
| WO | WO 2007/141052 A1 | 12/2007 |

OTHER PUBLICATIONS

International Search Report for PCT Application No. PCT/FI2011/050682 dated Nov. 1, 2011, pp. 1-6.
Written Opinion for PCT Application No. PCT/FI2011/050682 dated Nov. 1, 2011, pp. 1-8.
"Canon U.S.A. Unveils Four New Additions to Award Winning PowerShot Digital Camera Lineup," http://www.usa.canon.com/cusa/about_canon/products?pageKeyCode=pressreldetail&docId=0901e0248013454f, Feb. 8, 2010.

* cited by examiner

*Primary Examiner* — Anand Bhatnagar
(74) *Attorney, Agent, or Firm* — Ditthavong & Steiner, P.C.

(57) ABSTRACT

An approach is provided for recognizing objects in media content. The capture manager determines to detect, at a device, one or more objects in a content stream. Next, the capture manager determines to capture one or more representations of the one or more objects in the content stream. Then, the capture manager associates the one or more representations with one or more instances of the content stream.

20 Claims, 13 Drawing Sheets

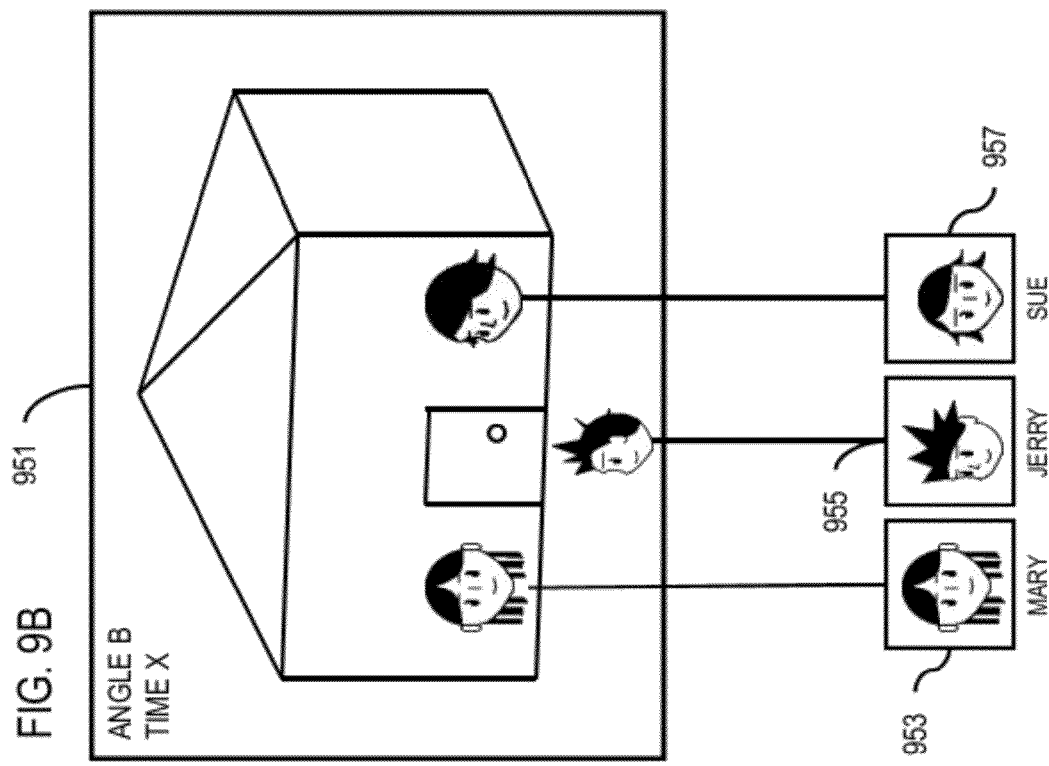
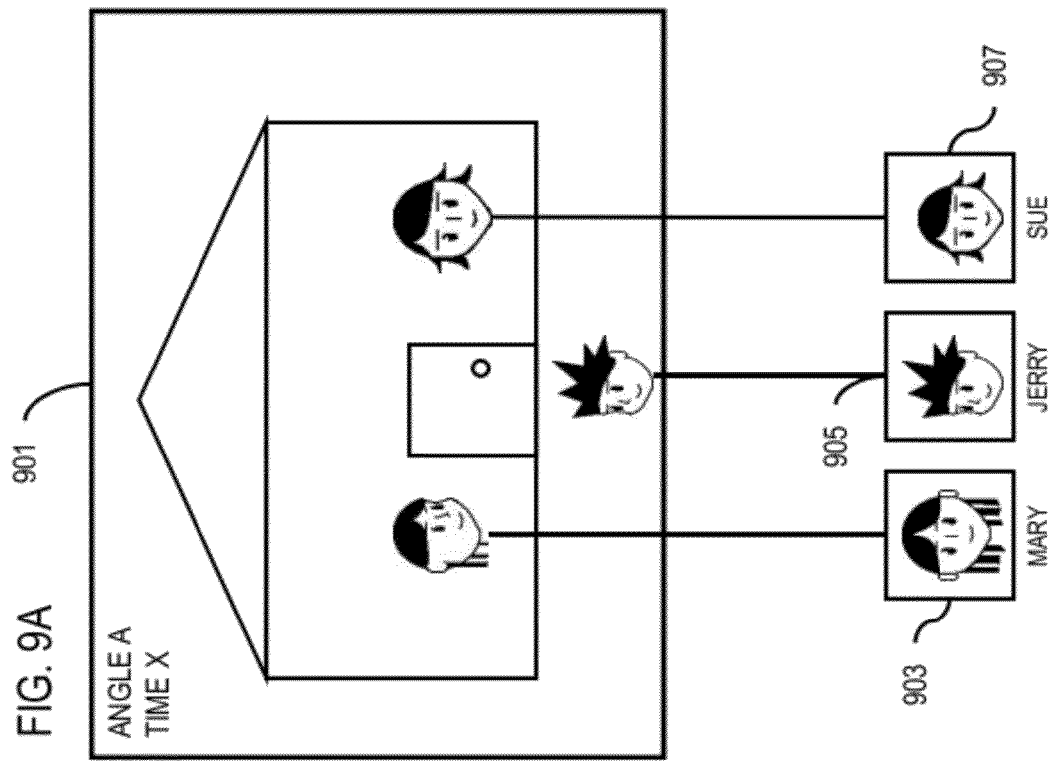

METHOD AND APPARATUS FOR RECOGNIZING OBJECTS IN MEDIA CONTENT

BACKGROUND

Service providers and device manufacturers (e.g., wireless, cellular, etc.) are continually challenged to deliver value and convenience to consumers by, for example, providing compelling network services. One area of development has been the use of technology for automated recognition of faces, people, and other objects or features (e.g., recognition of expressions such as facial expressions, body gestures, movement, voice, sound, etc.) within media content such as images, video streams, and audio streams. For example, many modern communication devices (e.g., smartphones, handsets, etc.) are commonly equipped with cameras and other sensors (e.g., microphones) that enable the devices to perform such recognition (e.g., facial, voice, expression recognition, etc.) on captured content. However, these devices often employ conventional methods for facial and/or object recognition that have traditionally struggled to perform accurately under certain conditions (e.g., noise, varying expressions, bad angle, poor lighting, low resolution images or sounds, etc.). Accordingly, service providers and device manufactures face significant technical challenges to improving the accuracy of facial and/or object recognition.

SOME EXAMPLE EMBODIMENTS

Therefore, there is a need for an approach for effectively and efficiently recognizing faces, objects, and other features in media content.

According to one embodiment, a method comprises determining to detect, at a device, one or more objects in a content stream. The method also comprises determining to capture one or more representations of the one or more objects in the content stream. The method further comprises associating the one or more representations with one or more instances of the content stream.

According to another embodiment, an apparatus comprises at least one processor, and at least one memory including computer program code, the at least one memory and the computer program code configured to, with the at least one processor, cause, at least in part, the apparatus to determine to detect, at a device, one or more objects in a content stream. The apparatus is also caused to determine to capture one or more representations of the one or more objects in the content stream. The apparatus is further caused to associate the one or more representations with one or more instances of the content stream.

According to another embodiment, a computer-readable storage medium carries one or more sequences of one or more instructions which, when executed by one or more processors, cause, at least in part, an apparatus to determine to detect, at a device, one or more objects in a content stream. The apparatus is also caused to determine to capture one or more representations of the one or more objects in the content stream. The apparatus is further caused to associate the one or more representations with one or more instances of the content stream.

According to another embodiment, an apparatus comprises means for determining to detect, at a device, one or more objects in a content stream. The apparatus also comprises means for determining to capture one or more representations of the one or more objects in the content stream. The apparatus further comprises means for associating the one or more representations with one or more instances of the content stream.

Still other aspects, features, and advantages of the invention are readily apparent from the following detailed description, simply by illustrating a number of particular embodiments and implementations, including the best mode contemplated for carrying out the invention. The invention is also capable of other and different embodiments, and its several details can be modified in various obvious respects, all without departing from the spirit and scope of the invention. Accordingly, the drawings and description are to be regarded as illustrative in nature, and not as restrictive.

BRIEF DESCRIPTION OF THE DRAWINGS

The embodiments of the invention are illustrated by way of example, and not by way of limitation, in the figures of the accompanying drawings:

FIGS. 9A-9B are diagrams of representations of objects in instances of a content stream captured from different angles in the process of FIG. 3, according to various embodiments;

DESCRIPTION OF SOME EMBODIMENTS

Examples of a method, apparatus, and computer program for recognizing objects in media content are disclosed. In the following description, for the purposes of explanation, numerous specific details are set forth in order to provide a thorough understanding of the embodiments of the invention. It is apparent, however, to one skilled in the art that the embodiments of the invention may be practiced without these specific details or with an equivalent arrangement. In other instances, well-known structures and devices are shown in block diagram form in order to avoid unnecessarily obscuring the embodiments of the invention.

Figure 1:
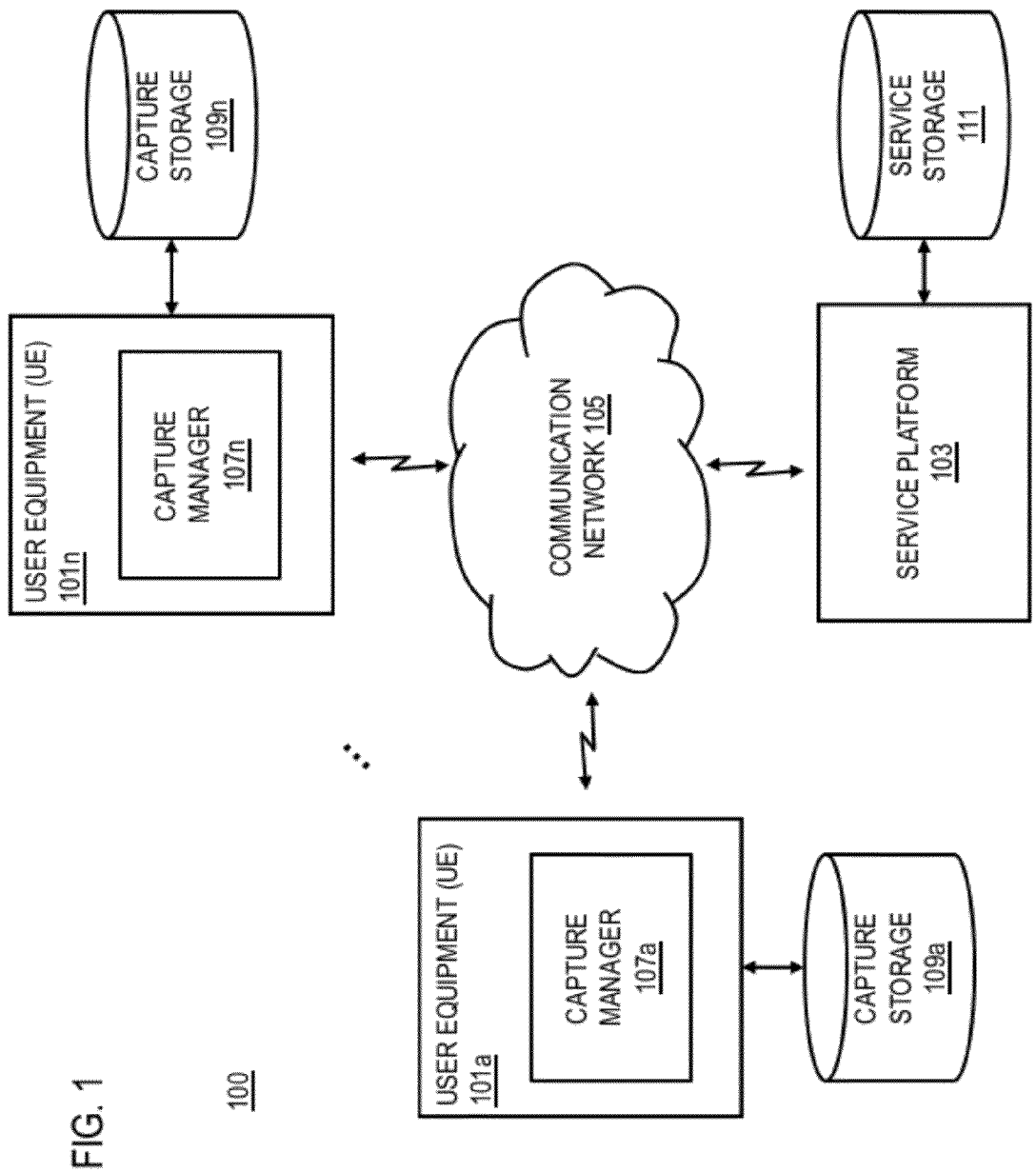
FIG. 1 is a diagram of a system capable of recognizing objects in media content, according to one embodiment.

FIG. 1 is a diagram of a system capable of recognizing objects in media content, according to one embodiment. As previously mentioned, recognition methods such as facial or voice recognition have been under development over the years. As a result of this development, recognition methods have become even more sophisticated and accurate. For example, facial recognition methods have been extended to recognize facial expressions by analyzing notable features of a face such as eyes, a nose, and a mouth, and relative distances to key facial features. Additionally, voice and sound recognition methods have been extend from recognizing speech to recognizing vocal expressions, such as laughter and crying, as well as general ambient or background noises (e.g., traffic, sounds from a party, etc.). However, as previously noted, recognition methods still struggle to perform under certain conditions (e.g., noise, varying expressions, bad angle, poor lighting, low resolution images or sounds, etc.) that may render the recognition less than optimal or sometimes inaccurate. Moreover, traditional recognition methods operate primarily on a specific instance of captured content (e.g., a single captured photograph of a scene), thereby relying generally on the recognition conditions of the specific instance. As a result, in circumstances where the conditions associated with the subject of the recognition (e.g., an object or face, also collectively referred to as an object) in the captured instance is not ideal for recognition, traditional recognition methods may not be able to accurately recognize the object. For example, face recognition can produce inaccurate results when the faces are far away, are not directly oriented toward the capture device (e.g., camera, camcorder, etc.), are obscured by shadows, etc. when the image is captured.

To address this problem, a system 100 of FIG. 1 introduces the capability to store or otherwise associate optimal representations of objects with the corresponding captured instances (e.g., photographs, audio recordings, video recordings, etc.) of the objects. In one embodiment, these optimal representations (e.g., representations captured under conditions that are more favorable for performing object recognition such as when a face is looking directly at the camera) may be attached as metadata to the captured instances. In another embodiment, when an application or other service seeks to perform object recognition on the captured instance, the attached or associated optimal representation(s) of the object can be recognized in place of the actual object in the captured instance. For example, in cases where the captured instances are photographs containing one or more faces, one or more optimal representations of the faces may be attached to each photograph. In this way, the faces can be automatically recognized even if the faces are, for instance, turned away from the camera or otherwise obscured.

More specifically, the system 100 detects objects in a content stream before, after, and/or while instances (e.g., photographs, audio recordings, video recordings, etc.) of the content stream are captured. By way of example, a content stream represents content that is continuously or substantially continuously received at a capture device such as images received at a viewfinder of a camera, or audio received on an open microphone. Once an object is detected in the content stream, the system 100 may continue to track the object as the circumstances with regard to the object changes (e.g., people move around, faces are turned away from the camera, lighting changes, etc.). Concurrently, the system 100 captures representations of the objects in the content stream (e.g., continuously or periodically). In one embodiment, the system 100 may capture the representations of the objects before, after, and/or while instances of the content stream are captured. In another embodiment, when a user initiates a capture of a specific instance of the content stream (e.g., when actuating the shutter on a camera to take a photograph) including the object, the tracked object information, and the corresponding one or more of the optimal representations of the object can be associated or tagged to the captured instance. In some embodiments, the tracking information includes information identifying at least the relative position of the object within the captured instance, thereby enabling the system 100 to associate the optimal representations of the object to the position of the object within the captured instance. As noted above, for any object captured as part of an instance, the system 100 does not need to rely on the particular representation of the object present in the instance for recognition purposes. Instead, the system 100 may use any of the representations of the object captured before, after, and/or while the instance is captured to represent the object in the instance of the content stream.

In another embodiment, the system 100 may select the representations based on one or more criteria (e.g., position, angle, lighting, sharpness, blurriness, noise, resolution, etc.). For example, if the object in the representations is a face, the representation may be selected based on one or more preferred facial expressions. In this case, a representation may be selected if the corresponding face is smiling, laughing, etc. In some cases, the optimal representation may be selected when the face has the most neutral expression (e.g., no expression). In yet another embodiment, the representations are captured continuously, periodically, or at a predetermined schedule until the quality (e.g., suitability for object recognition) of the representations meet a predetermined quality threshold. Although the representations can continue to be captured (e.g., as long as the capture device is powered on), the predetermined quality threshold condition allows for the capture of, at least, representations that meet the predetermined quality threshold and allows, for example, mobile devices to conserve battery life by avoiding unnecessary capture of additional representations. Thereafter, the system 100 may associate, for example, the optimal representations of the objects with the instances of the content stream. According to another embodiment, the system 100 can notify the user if the quality threshold is not met and ask user to point the camera towards the faces or objects for which the quality threshold has not been met. In this way, the user is can attempt to directly capture an optimal representation apart from capturing the actual instance or photograph of the scene.

As shown in FIG. 1, the system 100 comprises a user equipment (UE) 101 or multiple UEs 101a-101n having connectivity to a service platform 103 via a communication network 105. Although the service platform 103 is shown as an independent component of the communication network 105, it is contemplated that the service platform 103 may be incorporated into any other component of the system 100 including any of the components discussed below. In one embodiment, a UE 101 may include or be connected to a capture manager 107. The UE 101 may also include or be connected to a capture storage 109. The capture manager 107 may communicate with the capture storage 109 to access or store media data or any other forms of data. The capture manager 107 may also communicate with a media-capturing device (e.g., digital camera, camcorder, sound recorder, etc.) in or connected to the UE 101 to detect objects in a content stream, and capture the object representations and instances of the content stream. The capture manager 107 may further perform the function of associating the representations with instances of the content stream. Moreover, the capture manager 107 may perform the functions of determining recognition information of the objects in the content stream and also associating the recognition information with the instances of the content stream. The capture manager 107 may also provide visualization (e.g. graphical user interface) to allow a user to add or modify recognition information to assist the capture manager 107 in determining and associating the recognition information with the instances of the content stream.

Further, the capture manager 107 is capable of handling various communication operations using any form of communications available at the UE 101. For example, the capture manager 107 may manage incoming or outgoing communications via the UE 101, and display such communications as they are received or processed. In certain embodiments, the capture manager 107 may also provide visualization (e.g. graphical user interface) to allow a user to control communications or share media over the communication network 105 using any available form of communications. For example, the capture manager 107 may include an option to select communications with the UEs 101a-101n in order to share media data or other forms of data. Further, the capture manager 107 may include interfaces that allow the user to communicate with any Internet-based websites or to use e-mail services via the service platform 103. In addition, the capture manager 107 may also include interfaces to interact with social networking services, and to enable the uploading or sharing of media from the UE 101 to the social networking services.

The service platform 103 is performs various computations associated with detecting, tracking, and recognizing objects in media content as described herein. In addition or alternatively, at least some or all of the computations may be performed for the UE 101. For example, the UE 101 may send object representations to the service platform 103 in order to perform comparison computations between one or more representations and one or more other representations to determine the best object representations from the two sets. After computing the results, the service platform 103 may send the results of the computations to the UE 101.

In another example, the UE 101 may request recognition information for an image instance that was recently captured (e.g., a photograph captured at the UE 101) by sending the representations of the objects within the image instance (e.g., optimal images of the objects attached or tagged to the captured image file as metadata) to the service platform 103. In response, the service platform 103 may compare the transmitted representations with other representations in the database that are associated with similar image instances (e.g., previously captured and recognized photographs of the same objects) having recognition information. In addition or alternatively, the service platform 103 may employ one or more recognition algorithms to generate recognition information from the transmitted representations and/or captured image instance. By way of example, the service platform 103 may perform a visual object recognition by constructing a visual signature of the representations and then comparing the constructed signature against known signatures (e.g., previously acquired signatures, known signatures from a database, known signatures obtained by Internet searches, etc.). In one example, the visual signature is based on identifying features in the representation, relative distances between the features, size or characteristics of the features, etc. to uniquely identify the respective objects in the representations and/or captured image.

If a match is found or the recognition information is otherwise generated, the service platform 103 may send the discovered recognition information to the UE 101. Otherwise, the service platform 103 may send a message stating that no recognition information was found in the database.

The service platform 103 is also able to perform various services related to communication to the UEs 101a-101n, such that the UEs 101a-101n can communicate with each other over the communication network 105. The services provided by the service platform 103 may include a cellular phone service, internet service, data transfer service, etc. The service platform 103 may also provide content such as music, videos, television services, etc. The service platform 103 may further include or be connected to a service storage 111 to store or access media data or any other forms of data.

As used herein, the term database refers to a database either in the capture storage 109, the service storage 111, another storage component of the communication network 105, or a combination thereof. Also, as used herein, the term "media" refers to various forms of media, including audio, video, still images, pictures, etc. Further, as used herein, the term "image" refers to one or a series of images taken by a camera (e.g., a still camera, digital camera, video camera, camera phone, etc.) or any other imaging equipment. By way of example, a single image may represent a photograph and multiple images may be combined in sequence to make a video clip.

By way of example, the communication network 105 of system 100 includes one or more networks such as a data network (not shown), a wireless network (not shown), a telephony network (not shown), or any combination thereof. It is contemplated that the data network may be any local area network (LAN), metropolitan area network (MAN), wide area network (WAN), a public data network (e.g., the Internet), short range wireless network, or any other suitable packet-switched network, such as a commercially owned, proprietary packet-switched network, e.g., a proprietary cable or fiber-optic network, and the like, or any combination thereof. In addition, the wireless network may be, for example, a cellular network and may employ various technologies including enhanced data rates for global evolution (EDGE), general packet radio service (GPRS), global system for mobile communications (GSM), Internet protocol multimedia subsystem (IMS), universal mobile telecommunications system (UMTS), etc., as well as any other suitable wireless medium, e.g., worldwide interoperability for microwave access (WiMAX), Long Term Evolution (LTE) networks, code division multiple access (CDMA), wideband code division multiple access (WCDMA), wireless fidelity (WiFi), wireless LAN (WLAN), Bluetooth®, Internet Protocol (IP) data casting, satellite, mobile ad-hoc network (MANET), and the like, or any combination thereof.

The UE 101 is any type of mobile terminal, fixed terminal, or portable terminal including a mobile handset, station, unit, device, multimedia computer, multimedia tablet, Internet node, communicator, desktop computer, laptop computer, notebook computer, netbook computer, tablet computer, wearable device, personal communication system (PCS) device, personal navigation device, personal digital assistants (PDAs), audio/video player, digital camera/camcorder, positioning device, television receiver, radio broadcast receiver, electronic book device, game device, or any combination thereof, including the accessories and peripherals of these devices, or any combination thereof. It is also contemplated that the UE 101 can support any type of interface to the user (such as "wearable" circuitry, etc.).

Figure 10:
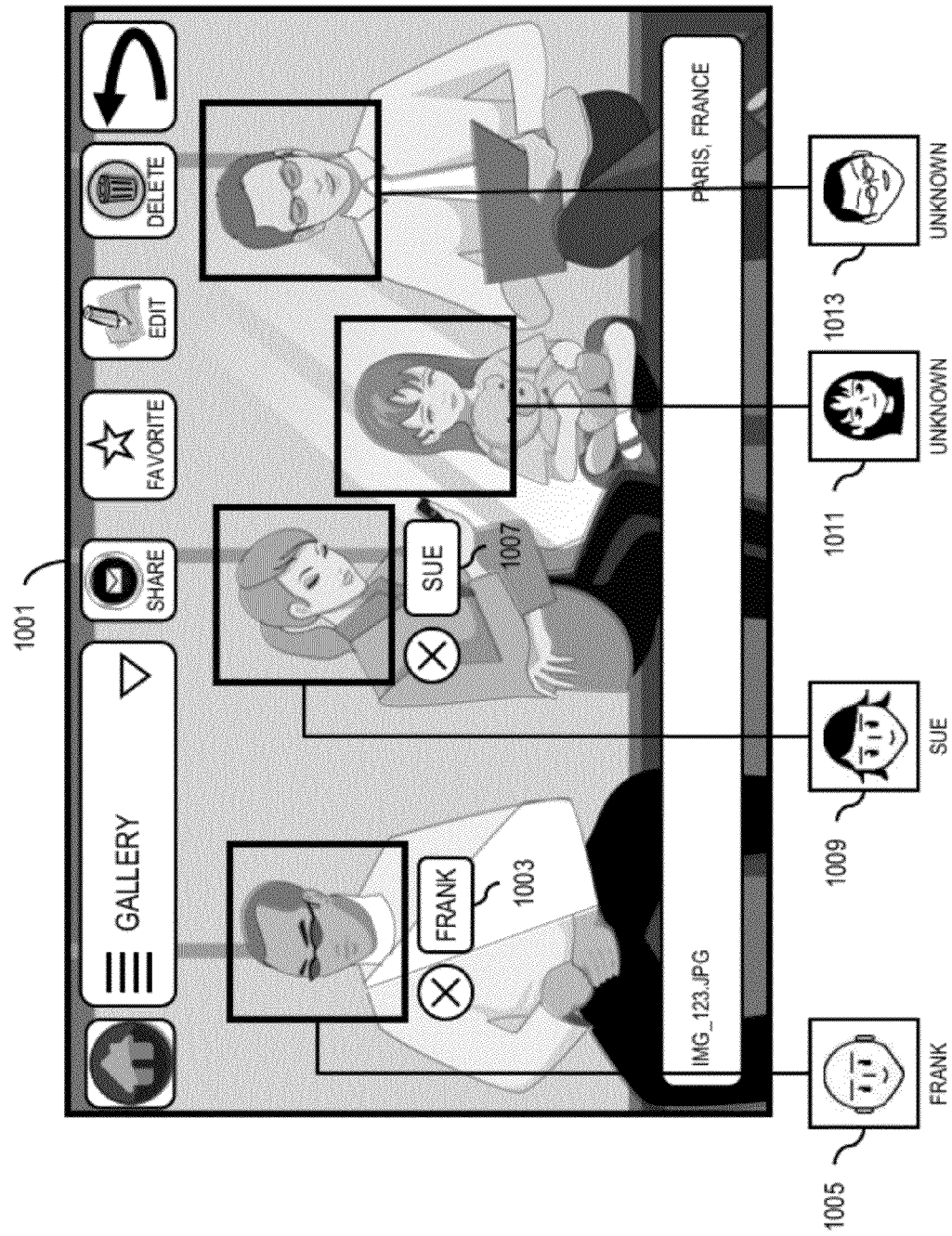
FIG. 10 is a diagram of a user interface for utilizing the processes of FIGS. 4, 6, and 7, according to one embodiment.

In one embodiment, an object may be recognized by determining recognition information based on the representations. For example, a person in an image may be recognized by a face representation associated with the image. Recognition information (e.g., the person's name) may be determined from the face representation because the face representation may already have recognition information associated with it if, for example, the person has previously been tagged or recognized in another image existing in the database. After the object is recognized, the recognition information may be associated with the instance containing the object. As shown in FIG. 10, tagging may be one way of associating the recognition information with the instance.

In another embodiment, the determination of the recognition information is further based on resources available at the device, another device, a server, a network component, or a combination thereof. To utilize resources efficiently, recognition information may be determined while the resources of the components that perform the recognition information determination function are underutilized or otherwise available.

In another embodiment, the representations may be stored as metadata in the instances, as metadata in a storage linked to the instances, or a combination thereof. In a further embodiment, the recognition information may also be stored as metadata in the instances, as metadata in a storage linked to the instances, or a combination thereof. In general, files (e.g., documents, images, videos, etc.) contain metadata and the metadata contained within those files may be easily discoverable. This situation is not a problem especially when the files and information about the files are intended to be shared. For example, a user may want to share representations and recognition information associated with a particular image. The user may upload the image to a public server or a social networking website to share with the user's friends. Because the image contains the representations and the recognition information as metadata, the user's friends may download the image and use the image to update their own images with the new metadata information. However, a user may also want to share the image with the user's friends and keep the representations and the recognition information private. As such, storing the representations and the recognition information as metadata in a secure storage linked to the instances may be more ideal. This way, the representations and the recognition information may be used for recognition purposes by the user, but not by other users even where the image itself is shared.

In another embodiment, the representations may be associated with respective time stamps. Further, the representations may be associated with the instances based on the time stamps. For example, multiple face representations of a person may be stored—each representation having a time stamp based on when the representation was captured. When images are captured or added to the database, the face representation having a time stamp closest to the time a particular image was captured will be selected to represent the person in the image.

In another embodiment, there may be one or more content streams. For example, the UE 101 may accept multiple content streams (e.g. multiple microphones, multiple cameras, etc.), either simultaneously or at different times, containing the same or different types of instances. Additionally, the UE 101 may accept content streams from one or more of the other UEs 101*a*-101*n*, the service platform 103, other components of the communication network 105, or a combination thereof via, for instance, the communication network 105. In yet another embodiment, representations may be received from other devices (e.g., other UEs 101*a*-101*n*, the service platform 103, other components of the communication network 105, or a combination thereof), other content streams, or a combination thereof. As such, representations from one content stream may be selected to represent objects in an instance of another content stream. For example, an optimal representation, existing in the database, captured from an earlier content stream may later be updated or replaced with a new representation captured from another content stream if the new representation is determined to be of a better quality. In addition, as described with respect to FIGS. 9A-9B, users may automatically or manually share object representations with each other via, for instance, the communication network 105.

In another embodiment, the representations correspond to characteristics of the objects (e.g., facial characteristics, expressions, body gestures, movement, voice, sound, etc.). Multiple representations for different types of circumstances with regard to the object may be captured to present the different types of circumstances. For example, a representation may be captured for each facial expression, including a smiling face, a crying face, a calm face, etc.

In another embodiment, the content stream may be a live video stream, and the instances may be images, videos, audio recordings, or a combination thereof. For example, a capture device, such as a camera, a camcorder, etc., may include a viewfinder that may display the live video stream, where the instances are images, videos, audio recordings, or a combination thereof.

By way of example, the UE 101 and the service platform 103 communicate with each other and other components of the communication network 105 using well known, new or still developing protocols. In this context, a protocol includes a set of rules defining how the network nodes within the communication network 105 interact with each other based on information sent over the communication links. The protocols are effective at different layers of operation within each node, from generating and receiving physical signals of various types, to selecting a link for transferring those signals, to the format of information indicated by those signals, to identifying which software application executing on a computer system sends or receives the information. The conceptually different layers of protocols for exchanging information over a network are described in the Open Systems Interconnection (OSI) Reference Model.

Communications between the network nodes are typically effected by exchanging discrete packets of data. Each packet typically comprises (1) header information associated with a particular protocol, and (2) payload information that follows the header information and contains information that may be processed independently of that particular protocol. In some protocols, the packet includes (3) trailer information following the payload and indicating the end of the payload information. The header includes information such as the source of the packet, its destination, the length of the payload, and other properties used by the protocol. Often, the data in the payload for the particular protocol includes a header and payload for a different protocol associated with a different, higher layer of the OSI Reference Model. The header for a particular protocol typically indicates a type for the next protocol contained in its payload. The higher layer protocol is said to be encapsulated in the lower layer protocol. The headers included in a packet traversing multiple heterogeneous networks, such as the Internet, typically include a physical (layer 1) header, a data-link (layer 2) header, an internetwork (layer 3) header and a transport (layer 4) header, and various application headers (layer 5, layer 6 and layer 7) as defined by the OSI Reference Model.

Figure 2:
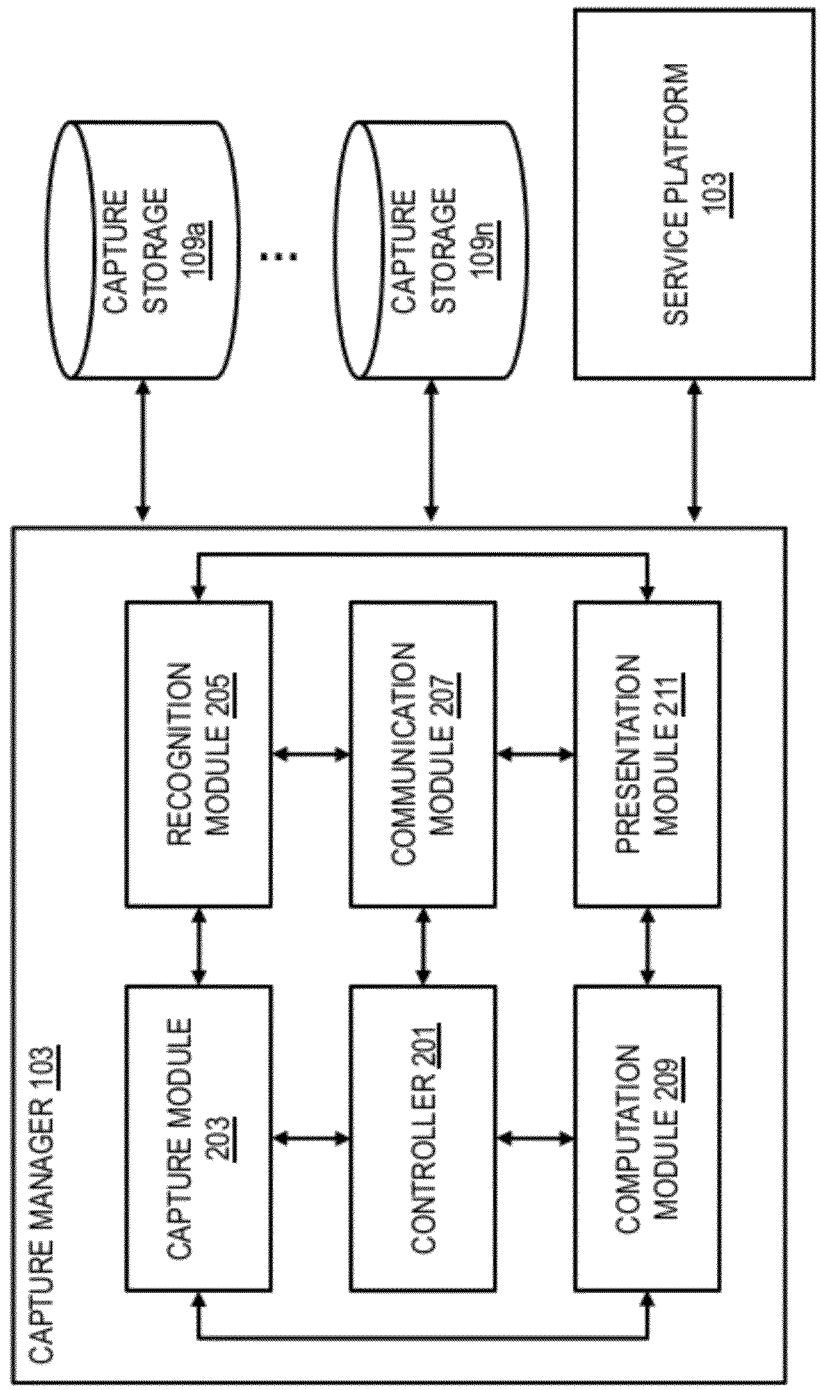
FIG. 2 is a diagram of the components of a capture manager, according to one embodiment.

FIG. 2 is a diagram of the components of a capture manager, according to one embodiment. By way of example, the capture manager 107 includes one or more components for recognizing objects in media content. It is contemplated that the functions of these components may be combined in one or more components or performed by other components of equivalent functionality. In this embodiment, the capture manager 107 includes a controller 201, a capture module 203, a recognition module 205, a communication module 207, a computation module 209, and a presentation module 211.

The controller 201 oversees tasks, including tasks performed by the capture module 203, the recognition module 205, the communication module 207, the computation module 209, and the presentation module 211. For example, although the other modules may perform the actual task, the controller 201 may determine when and how those tasks are performed or otherwise direct the other modules to perform the task.

The capture module 203 manages and controls the detection of objects in a content stream, and the capture of object representations and instances of the content stream. The capture module 203 may also handle the association of the object representations with the instances of the content stream. For example, the capture module 203 may determine to store the captured representations temporarily in either a buffer or a database until the optimal representations of objects are associated with the corresponding captured instances of the content stream. In another example, the capture module 203 may also control how often the representations are captured (e.g., continuously, periodically, or at a predetermined schedule) or when to stop capturing new representations (e.g., when the representations meet a quality threshold).

The recognition module 205 manages and controls the determination of recognition information of the objects in the content stream and the association of the recognition information with the instances of the content stream. The actual determination and association function may be performed by the recognition module 205, the service platform 103, another component of the communication network 105, or a combination thereof. For example, the recognition module 205 of a particular capture manager 107 may send new recognition information, such as a person's name associated with a person in a particular image, to the service platform 103 with instructions to update other images in the database with the transmitted recognition information. In response, the service platform 103 may perform comparisons between, for instance, one or more face representations to find images with face representations in the database that match the face representation associated with the transmitted recognition information. After associating the recognition information with matching images in the database, the service platform 103 may, thereafter, send the results of the updated associations to the recognition module 205. As such, the recognition module 205 may alleviate the amount of time and resources a user spends manually entering recognition information (e.g., tagging each image one by one) by automating the process.

The communication module 207 manages and controls any incoming and outgoing communication such as data sharing, receiving various requests from other UEs 101 or the service platform 103, as well as telephone calls, text messaging, instant messaging, and Internet communications. For example, as discussed above, the recognition module 205 may share new recognition information with the service platform 103, via the communication module 207, in order to update other images in the database with the new recognition information. The UE 101 may also be connected to storage media such as the capture storage 109a-109n such that the capture manager 107 can access or store communication history data. By way of example, if the capture storage 109a-109n are not local, then they may be accessed via the communication network 105. The UE 101 may also be connected to the service storage 111 via the communication network 105 such that the capture manager 107 may be able to manage or access data in the service storage 111.

The computation module 209 performs various computations, including determining and comparing the quality of captured representations based on one or more criteria (e.g., position, angle, lighting, sharpness, blurriness, noise, resolution, etc.), and matching representations in the database. The computational tasks may be in response to a request from other modules, such as the controller 201, the capture module 203, the recognition module 205, the communication module 207, or the presentation module 211, to perform various computations.

The presentation module 211 controls display of a user interface such as a graphical user interface to convey information and to allow the user to interact with the UE 101 via the interface. For example, the presentation module 211 may allow the user to add recognition information to a particular image by tagging a name to a person in the image. Thereafter, as discussed earlier, the recognition information may be transmitted to the recognition module 205 to update other image in the database. Further, the presentation module 211 interacts with the controller 201, the capture module 203, the recognition module 205, and the communication module 207 to display any information generated during their operations.

Figure 3:
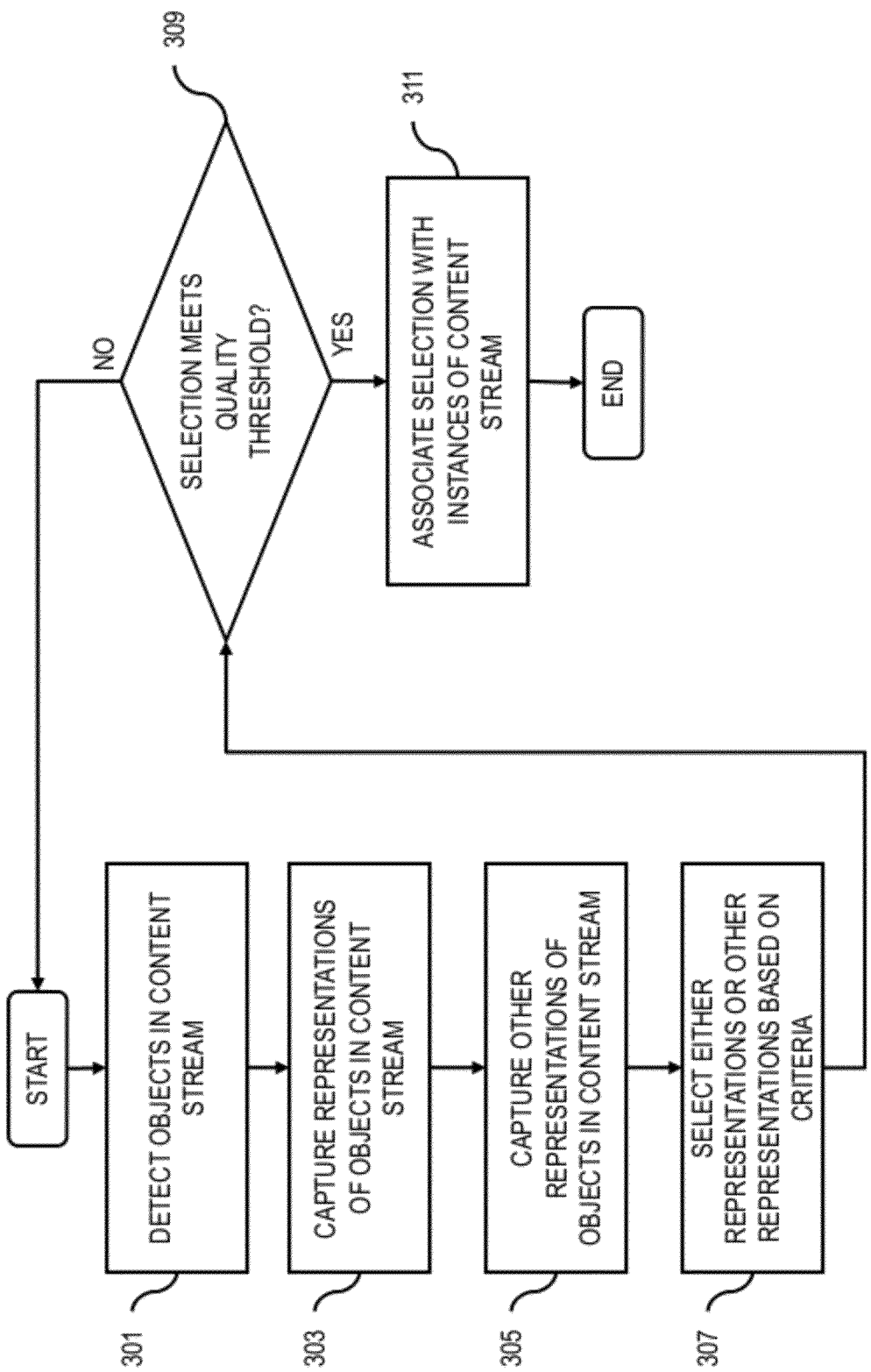
FIG. 3 is a flowchart of a process for recognizing objects in media content, according to one embodiment.
Figure 12:
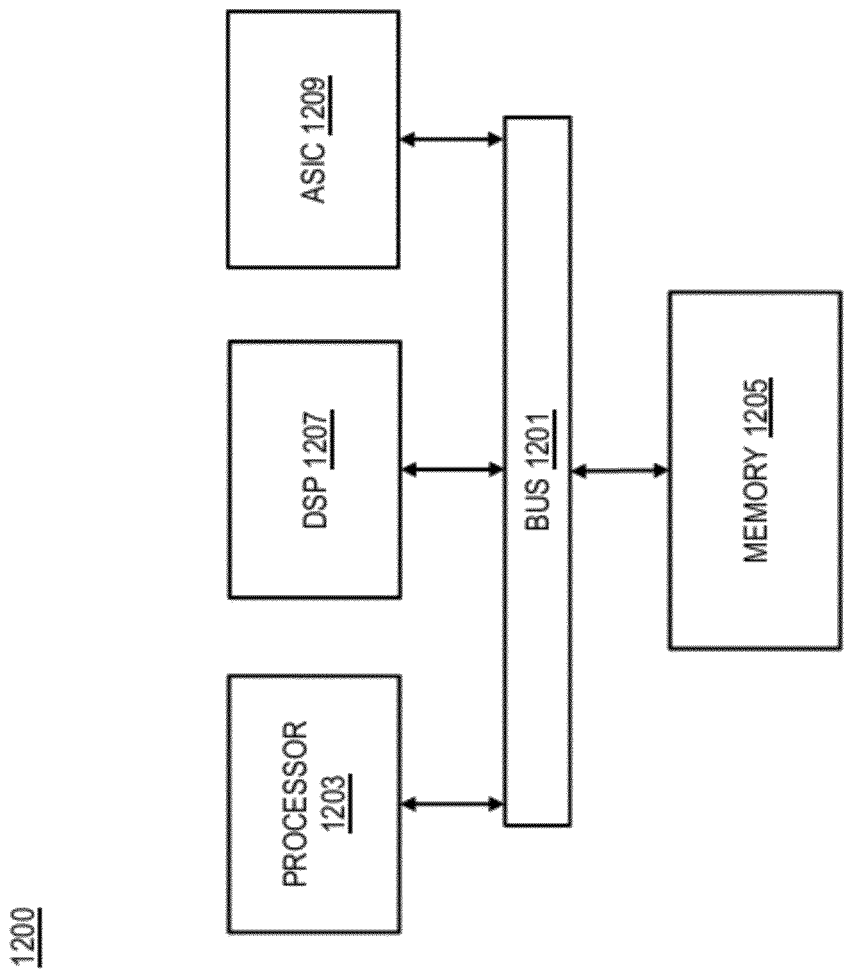
FIG. 12 is a diagram of a chip set that can be used to implement an embodiment of the invention.

FIG. 3 is a flowchart of a process for recognizing objects in media content, according to one embodiment. In one embodiment, the capture manager 107 performs the process 300 and is implemented in, for instance, a chip set including a processor and a memory as shown in FIG. 12. In step 301, the capture manager 107 determines to detect, at a device, one or more objects in a content stream. The detection may be performed before, after, and/or while an instance of the content stream is captured. In this way, if the object cannot be easily detected at the time an instance of the content stream is captured, the object may be detected well before or after the instance is captured. The capture manager 107 may continue to track the object as the circumstances with regard to the object changes (e.g., people move around, faces are turned away from the camera, lighting changes, etc.).

In step 303, the capture manager 107 determines to capture one or more representations of the one or more objects in the content stream. As discussed previously, the capture manager 107 may, as in step 305, also capture one or more other representations of the one or more objects in the content stream before, after, and/or while instances of the content stream are captured. For example, a UE 101 may have camera module configured to automatically detect, identify, and capture representations (e.g., the optimal images that are to be used for recognition) of objects and faces that are visible within its viewfinder image whenever the camera module is active. The UE 101 can then continuously process the series of images (e.g., a content stream) that is captured (e.g., continuously or periodically) at the viewfinder. In one embodiment, this content stream is captured even when the user has not instructed the UE 101 to capture an image. In this way, as the user is composing an image for capture, the UE 101 can identify and capture optimal images of the objects or faces present in the viewfinder scene (e.g., when the faces or objects are looking directly at the camera, not obscured, have optimal lighting, etc.), track the identified objects or faces, and associate the optimal images or representations with a captured instance (e.g., a captured photograph) of the content stream. The associated representations may then be used for recognition of the corresponding objects or faces in the captured instance.

For example, the user may activate the camera module of the UE 101 (e.g., by executing the camera application or turning the camera module on) to begin capturing a content stream of the images in the viewfinder or the field of view of the camera. The capture manager 107 can then initiate object and/or face detection on the image. The capture manager 107 maintains a record of each detected object and/or face and begins to track each detected face. In one embodiment, tracking includes identifying and recording the relative position of each object/face within in the captured content stream. During this process, the capture manager 107 need not recognize or determine the specific identify of the object or face. Instead, the capture manager 107 need only detect and track individual objects/faces so that they are individual distinguishable from other objects or faces. In other words, the capture manager 107 detects a particular object or face, stores the object or face, tracks the object or face in the content stream, and continues to follow the movement of the captured object or face in the content stream. Accordingly, when the user takes an image, any optimal representations of tracked objects and/or faces in the image can be linked or otherwise associated with the image (e.g., as metadata information associated with the image).

In one sample use case, a user may set up a camera to take a photograph of the user and the user's friends using the camera's timer function (e.g., ten second timer). As they are getting ready for the picture, the camera's capture manager 107 may capture several face representations for each person detected by the camera's viewfinder before the photograph is actually taken. After the photograph is captured, the capture manager 107 may continue to capture face representations of the people in the photograph to identify optimal images. If the optimal representations are found after the capture, the capture manager 107 can retroactively associate the representation with the captured instance. As such, the capture manager 107 does not need to rely on the particular face representations in the photograph captured, but may select any of the face representations captured to represent the people in the photograph. By way of example, FIGS. 8A-8B demonstrates a situation where an object representation captured before a particular image instance may represent the object in other image instances captured at a later time. Similarly, an object representation captured in between image instance captures or after all image instances have been captured may represent the object in multiple image instances.

Figure 8A:
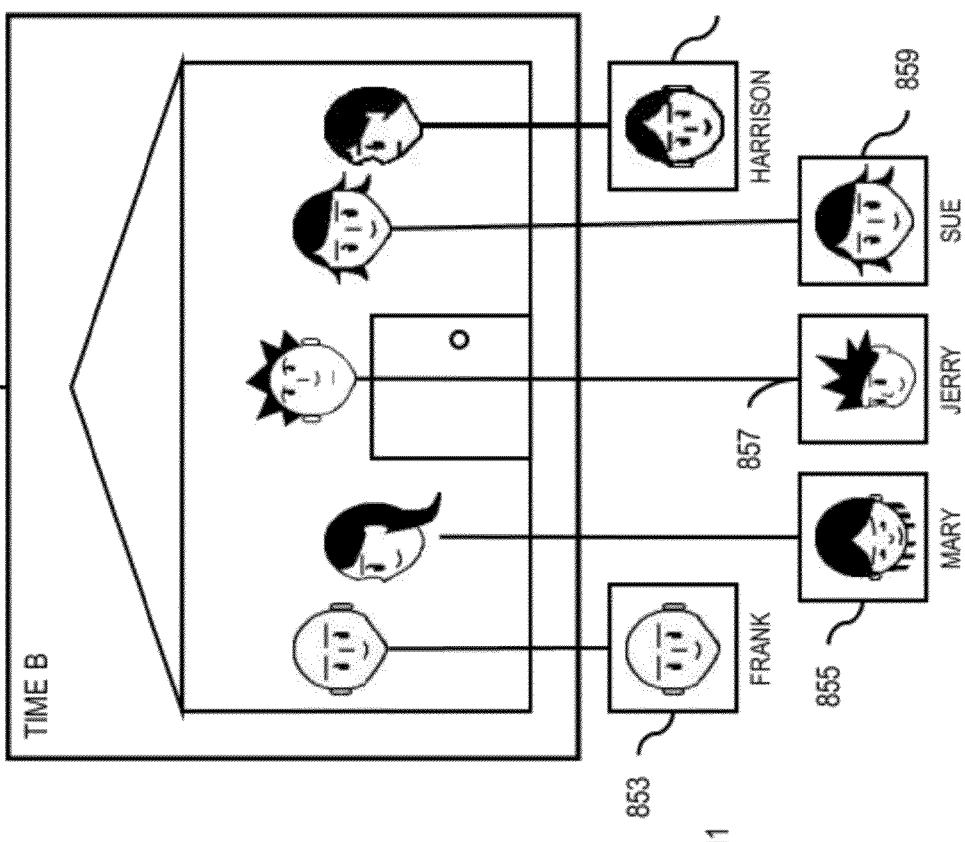
FIGS. 8A-8B are diagrams of representations of objects in instances of a content stream captured in the process of FIG. 3, according to various embodiments.
Figure 8B:
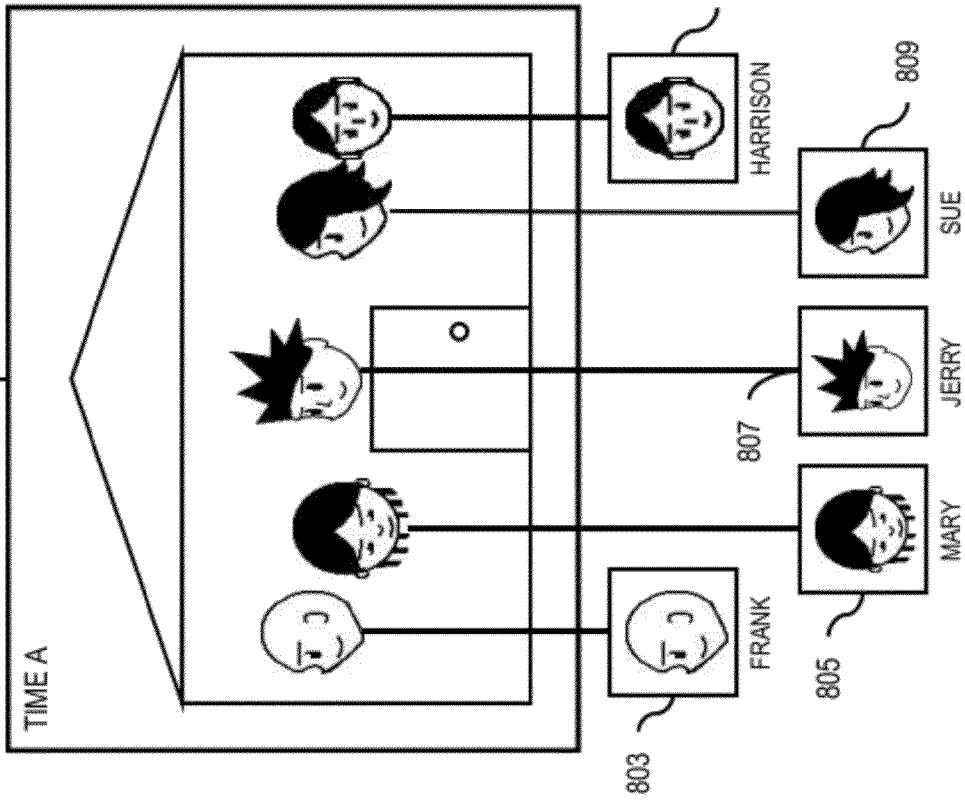

In another embodiment, the capture manager 107 may then, as in step 307, select either the one or more representations or the one or more other representations to associate with the one or more instances based, at least in part, on one or more criteria (e.g., position, angle, lighting, sharpness, blurriness, noise, resolution, etc.). In a further embodiment, the capture manager 107 may, as in step 309, capture the one or more representations or the one or more other representations continuously, periodically, or at a predetermined schedule until the one or more representations meet a predetermined quality threshold. Although the representations can continue to be captured, the predetermined quality threshold condition allows for the capture of, at least, representations that meet the predetermined quality threshold and allows, for example, the UE 101 to conserve battery life by avoiding unnecessary capture of additional representations. Thereafter, as in step 311, the capture manager 107 associates the selection (e.g., the one or more representations, the one or more other representations, etc.) with the one or more instances of the content stream. As previously discussed, the selected representations may be attached as metadata to the captured instances, which is one way that the capture manager 107 may associate representations with instances of the content stream. In addition, as shown in FIGS. 8A-8B, the capture manager 107 may associate a single representation with multiple instances.

Figure 4:
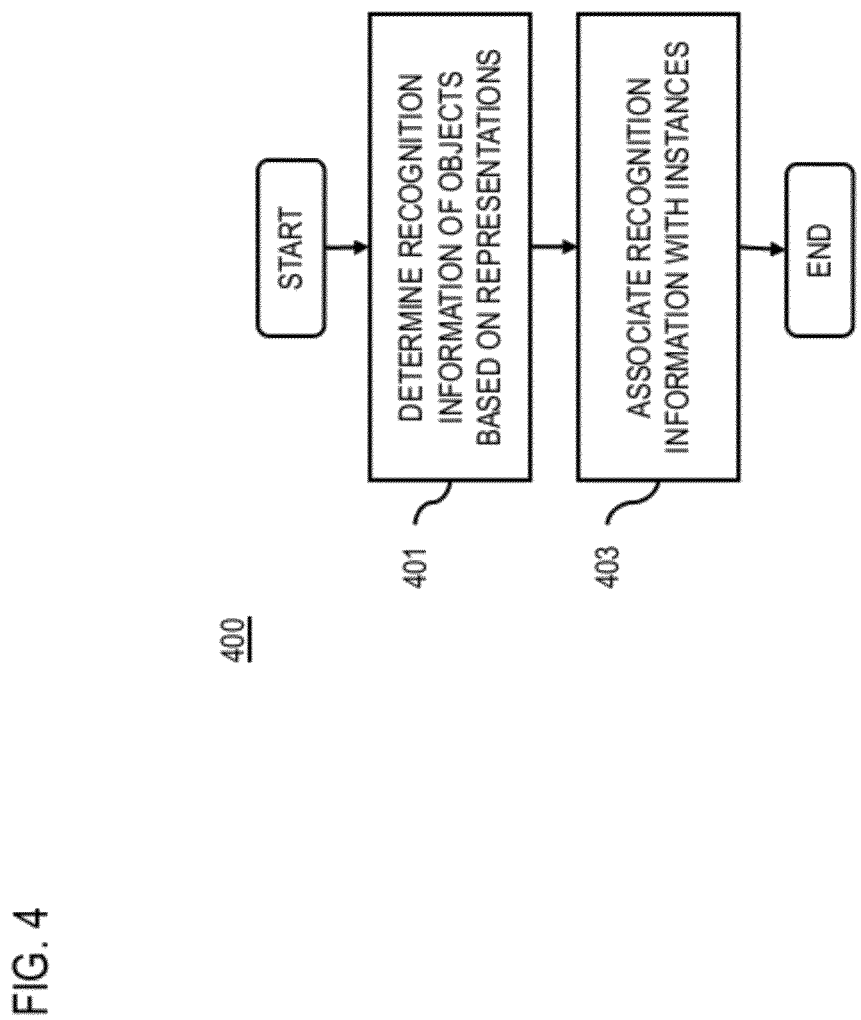
FIG. 4 is a flowchart of a process for associating recognition information with instances of a content stream, according to one embodiment.

FIG. 4 is a flowchart of a process for associating recognition information with instances of a content stream, according to one embodiment. In one embodiment, the capture manager 107 performs the process 400 and is implemented in, for instance, a chip set including a processor and a memory as shown in FIG. 12. In step 401, the capture manager 107 determines recognition information of the one or more representations based, at least in part, on the one or more representations. For example, a person in an image may be recognized by a face representation associated with the image. Recognition information (e.g., the person's name) may be determined from the face representation because the face representation may already have recognition information associated with it if, for example, the person has previously been tagged or recognized in another image existing in the database. In step 403, the capture manager 107 associates the recognition information with the one or more instances. As shown in FIG. 10, tagging may be one way of associating the recognition information with the one or more instances.

Figure 5:
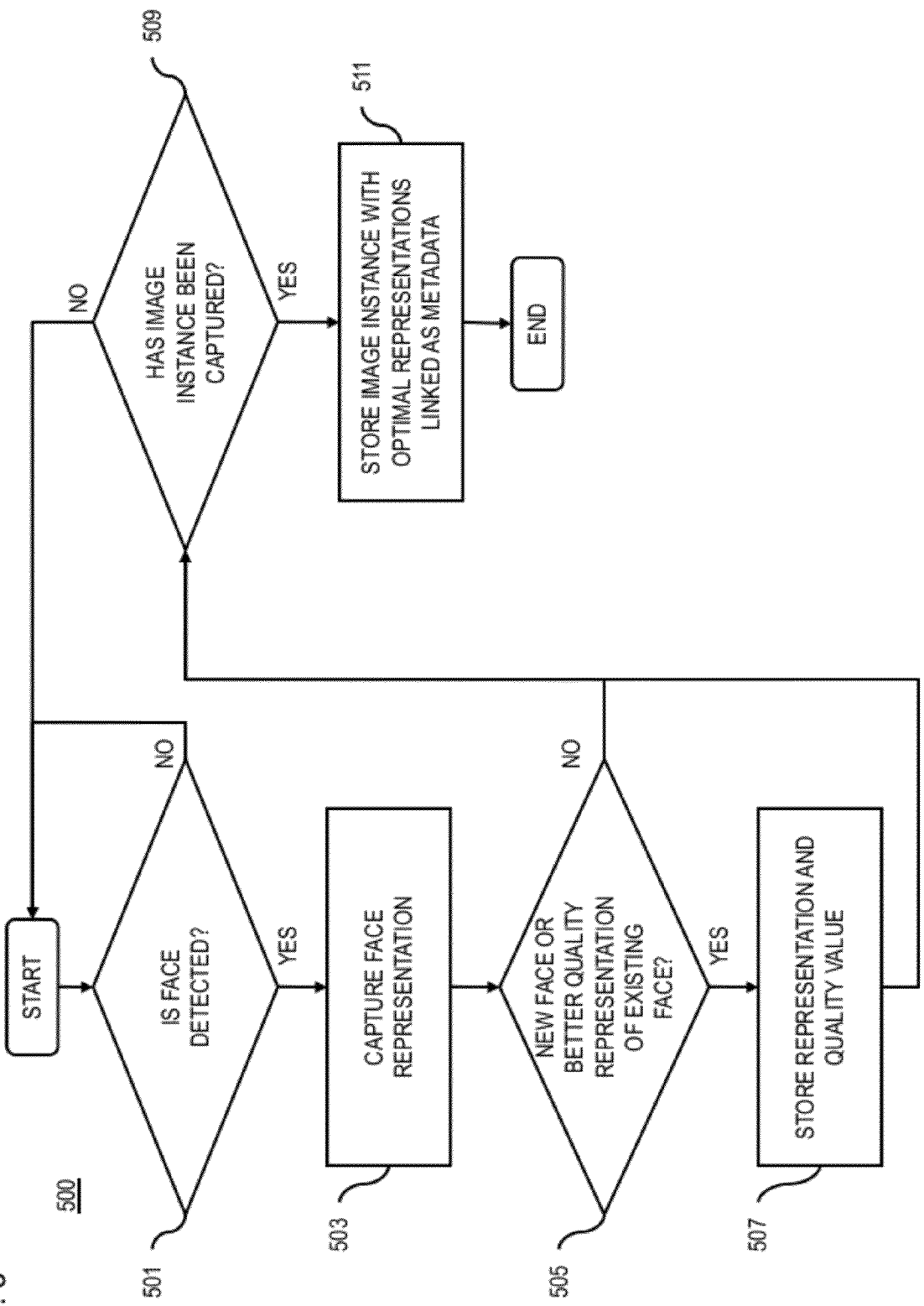
FIG. 5 is a flowchart of a process for associating optimal face representations with an image instance of a content stream, according to one embodiment.

FIG. 5 is a flowchart of a process for associating optimal face representations with an image instance of a content stream, according to one embodiment. In one embodiment, the capture manager 107 performs the process 500 and is implemented in, for instance, a chip set including a processor and a memory as shown in FIG. 12. In FIG. 5, the process 500 also demonstrates steps that may be carried out by the capture manager 107 when, for instance, a camera is turned one. The camera may show the user a content stream, such as a live video stream, on the camera's display via the presentation module 211 of the capture manager 107. Simultaneously, the capture manager 107 may start running the algorithm representing the process 500. As such, in step 501, the capture manager 107 begins by determining whether a face has been detected. It is noted that, in this step, the capture manager 107 only attempts to detect the faces; it does not attempt to recognize whose face it is. After a face has been detected, the capture manager 107, in step 503, captures a representation of the face. It is further noted that, during the process 500, the people shown on the camera's viewfinder might move around such that their faces may no longer be oriented towards the camera (e.g., with the back of the head towards the viewfinder). Even under this type of circumstance, the capture manager 107 may still capture face representations because the capture manager 107 may keep track of the faces (or the people) such that the capture manager 107 knows where they are even if they are not directly detectable.

Further, in step 505, the capture manager 107 determines whether the representation is of a new face or whether the representation is a better quality representation of a face already existing in the database. A face representation may be a better quality representation if it is easier to use later for recognition purposes based on one or more criteria (e.g., position, angle, lighting, sharpness, blurriness, noise, resolution, etc.). If the representation is of a new face or the representation is a better quality representation of an existing face, the capture manager 107 stores, per step 507, the representation and the quality value associated with the representation. The capture manager 107 may store the data, for instance, temporarily in a buffer or in a database. Otherwise, the capture manager 107, in step 509, determines whether an image instance has been captured. If an image instance has been captured, the capture manager 107, in step 511, stores the image instance with the optimal representation of the face linked as metadata in the database. It is noted that when the image instance is captured, a situation may rise where the face orientation at the time the image instance is captured may not be good enough for facial recognition. However, because previously captured face representations may be used to recognize the face, this type of situation is not a problem. If an image instance has not been captured, the capture manager 107 may continue to detect and capture other face representations.

Figure 6:
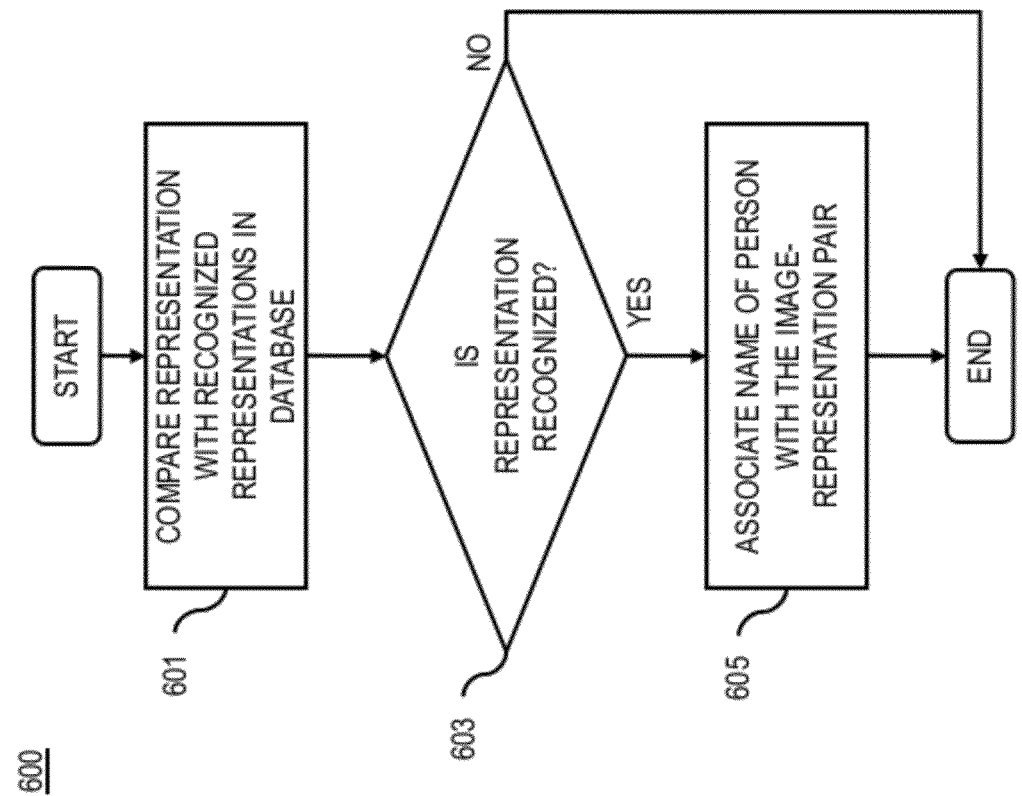
FIG. 6 is a flowchart of a process for associating recognition information with an image instance/face representation pair, according to one embodiment.

FIG. 6 is a flowchart of a process for associating recognition information with an image instance/face representation pair, according to one embodiment. In one embodiment, the capture manager 107 performs the process 600 and is implemented in, for instance, a chip set including a processor and a memory as shown in FIG. 12. In step 601, the capture manager 107 compares the representation of the image instance/face representation pair with recognized face representations in the database. In step 603, the capture manager 107 determines whether the representation is recognized or known based on the comparison. For example, the capture manager 107 may determine that a representation of one image instance/face representation pair is recognized or known if the representation matches a representation of another pair that has recognition information (e.g., the person's name) associated with it. If the representation is recognized, the capture manager 107, in step 605, associates the recognition information (e.g., the person's name) of the matching pair with the image instance/face representation pair. Otherwise, the capture manager 107 will leave the representation of the image instance/face representation pair unrecognized.

Figure 7:
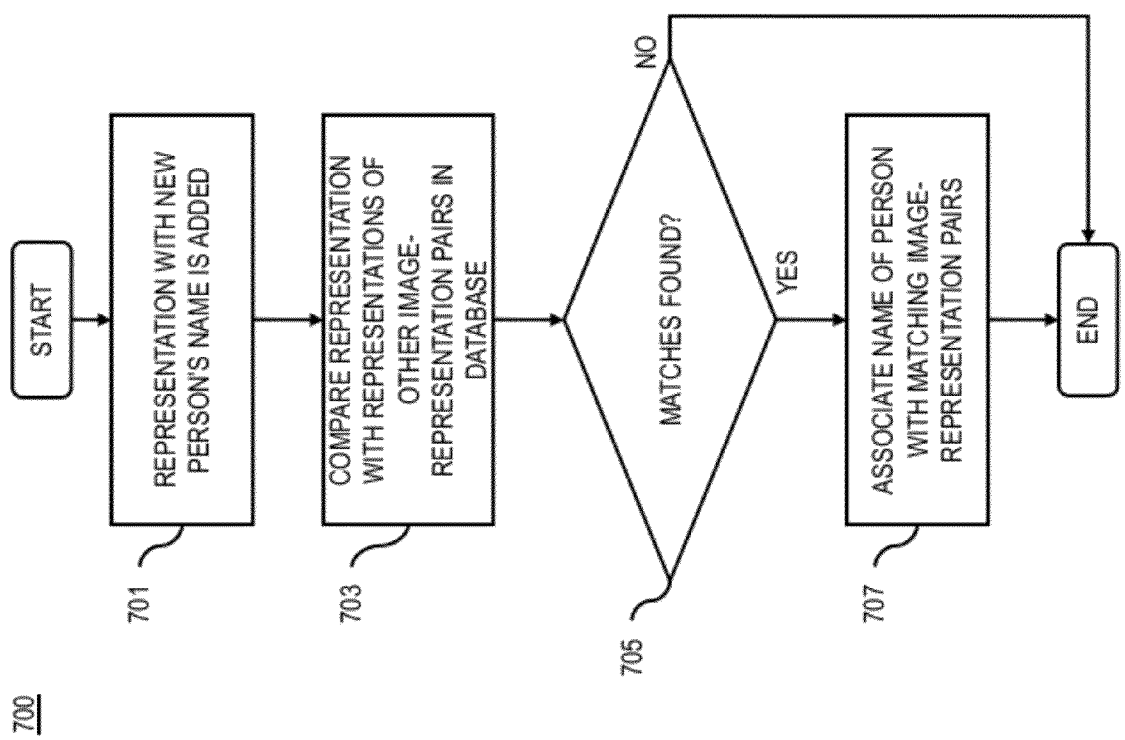
FIG. 7 is a flowchart of a process for associating recognition information with image instance/face representation pairs in a database, according to one embodiment.

FIG. 7 is a flowchart of a process for associating recognition information with image instance/face representation pairs in a database, according to one embodiment. In one embodiment, the capture manager 107 performs the process 700 and is implemented in, for instance, a chip set including a processor and a memory as shown in FIG. 12. In step 701, new recognition information (e.g., new person's name) associated with an image instance/face representation pair is added to the database (e.g., automatically or manually by a user). Similarly, existing recognition information already associated with an image instance/face representation pair in the database may also be modified. In step 703, the representation of the image instance/face representation pair is compared with representations of other image instance/face representation pairs in the database. In step 705, the capture manager determines whether there are any matches found. If there are one or more matches, the capture manager 107, in step 707, associates the new recognition information (e.g., the person's name) with the image instance/face representation pairs containing the matching representation.

FIGS. 8A-8B are diagrams of representations of objects in instances of a content stream captured in the process of FIG. 3, according to various embodiments. As described previously, the capture manager 107 may capture one or more representations and also capture one or more other representations. Thereafter, the capture manager 107 may select either the one or more representations or the one or more other representations to associated with the one or more instances based on one or more criteria (e.g., position, angle, lighting, sharpness, blurriness, noise, resolution, etc.).

FIGS. 8A-8B show two time instances of a content stream: instance 801 at time A with optimal representations 803, 805, 807, 809, and 811; and instance 851 at time B with optimal representations 853, 855, 857, 859, and 861. In FIG. 8A, the objects detected are Frank, Mary, Jerry, Sue, and Harrison. The representations captured of Frank, Mary, Jerry, Sue, and Harrison at time A are the optimal representations thus far. Accordingly, the optimal representations thus far at time A (e.g., optimal representations 803, 805, 807, 809, 811) for the instance at time A are shown.

In FIG. 8B, the objects detected are still Frank, Mary, Jerry, Sue, and Harrison. In this example, however, the representations captured of Frank, Mary, Jerry, Sue, and Harrison at time B are not necessarily the optimal representations thus far. For example, the capture manager 107 determines (e.g., based on position and angle) that the representation of Frank at time B is more optimal than the representation of Frank at time A because the representation of Frank at time B shows Frank's whole face while the representation at time A only shows the side of Frank's face. Therefore, in FIG. 8B, the capture manager 107 selects the representation of Frank at time B as the optimal representation thus far as shown by optimal representation 853.

In another example, in FIG. 8B, the capture manager 107 determines that the representation of Mary at time A is more optimal than the representation of Mary at time B because the representation of Mary at time A shows most of Mary's face while the representation of Mary at time B only shows the side of Mary's face. Therefore, in FIG. 8B, the capture manager 107 selects the representation of Mary at time A as the optimal representation thus far as shown by optimal representation 855. Similarly, in FIG. 8B, the capture manager 107 also performs the determination and selection function for Jerry, Sue, and Harrison as shown by optimal representations 857, 859, and 861.

FIGS. 9A-9B are diagrams of representations of objects in instances of a content stream captured from different angles in the process of FIG. 3, according to various embodiments. As described previously, the capture manager 107 may capture one or more representations and also capture one or more other representations. Thereafter, the capture manager 107 may select either the one or more representations or the one or more other representations to associated with the one or more instances based on one or more criteria (e.g., position, angle, lighting, sharpness, blurriness, noise, resolution, etc.). Moreover, as shown in FIGS. 9A-9B, the one or more representations or the one or more other representations may be captured from one or more content streams.

FIGS. 9A-9B show two instances: instance 901 of a content stream captured from angle A at time X with optimal representations 903, 905, and 907; and instance 951 of another content stream captured from angle B at time X with optimal representations 953, 955, and 957. In this example, one device (e.g., UE 101) may include two capture devices (e.g., multiple cameras, multiple camcorders, etc.)—each capture device separating streaming in content. However, in this example, it is also likely that two devices (e.g., UEs 101a-101n) are each separately streaming in content—one device streaming in content from angle A and the other device streaming in content from angle B. In FIG. 9A, the capture manager 107 detects the objects, Mary, Jerry, and Sue, and captures their representations from angle A. Similarly, in FIG. 9B, the capture manager 107 detects the objects, Mary, Jerry, and Sue, and captures their representations from angle B. As mentioned previously, a device may receive one or more representations from one or more other devices. For example, if there is one device at angle A and one device at angle B, the two devices may wirelessly share their captured representations with each other from their respective angles. Accordingly, the capture manager 107 for each device will select between the representations captured from angle A or the representations captured from angle B to associate with the instances based on one or more criteria. As shown in FIG. A, the representations selected to be associated with instance 901 are optimal representations 903, 905, 907. Likewise, in FIG. B, the representations selected to be associated with instance 951 are optimal representations 953, 955, and 957.

Optimal representations 901 and 951 are the captured representation of Mary from angle B, optimal representations 903 and 953 are the captured representation of Jerry from angle A, and optimal representations 905 and 955 are the captured representation of Sue from angle A.

FIG. 10 is a diagram of a user interface for utilizing the processes of FIGS. 4, 6, and 7, according to one embodiment. The UE 101 may incorporate the user interface 1001 to allow the user to interact with the system 100. In FIG. 10, the capture manager 107 realizes that several people are in the picture and highlights each of them with a square. Because the user may have previously tagged Frank and Sue in another image, the capture manager 107 may be able to determine their recognition information (e.g., their names) before, after, and/or while the image, shown in FIG. 10, is captured. When the image is captured, the capture manager 107 may associate the recognition information with the image by, for instance, tagging the image. As shown, Frank's recognition information 1003 is determined based on one or more representations including optimal representation 1005. Similarly, Sue's recognition information 1007 is determined based on one or more representations including optimal representation 1009. However, as shown, other people in the image have not yet been tagged. As such, the capture manager 107 was not able to determine their recognition information based on their representations (e.g., optimal representation 1011 and 1013) because their representations have not yet been associated with any recognition information. Thus, no recognition information or tags are displayed for the two people represented by optimal representations 1011 and 1013.

In addition, the user interface 1001 displays several icons that are associated with user options to perform specific interface functions (e.g., options from left to right: view the home menu, view a list of images in the gallery, share the image, save as a favorite, edit the image instance, delete the image instance, and go back to the previous screen). For example, the user interface 1001 may allow the user to edit the image instance, including the objects, the representations, and the recognition information associated with the image instance. Using the edit option, the user may be able to add new recognition information (e.g., new person's name) by, for instance, clicking anywhere inside the square around the object and typing in the recognition information. The user interface 1001 may then associate the new recognition information with the object representations. Subsequently, the process of FIG. 7 may automatically or manually be caused to run, thereby updating other image instances in the database. Similarly, the edit option may also be used to modify recognition information already associated with an image instance.

The processes described herein for recognizing objects in media content may be advantageously implemented via software, hardware, firmware or a combination of software and/or firmware and/or hardware. For example, the processes described herein, may be advantageously implemented via processor(s), Digital Signal Processing (DSP) chip, an Application Specific Integrated Circuit (ASIC), Field Programmable Gate Arrays (FPGAs), etc. Such exemplary hardware for performing the described functions is detailed below.

Figure 11:
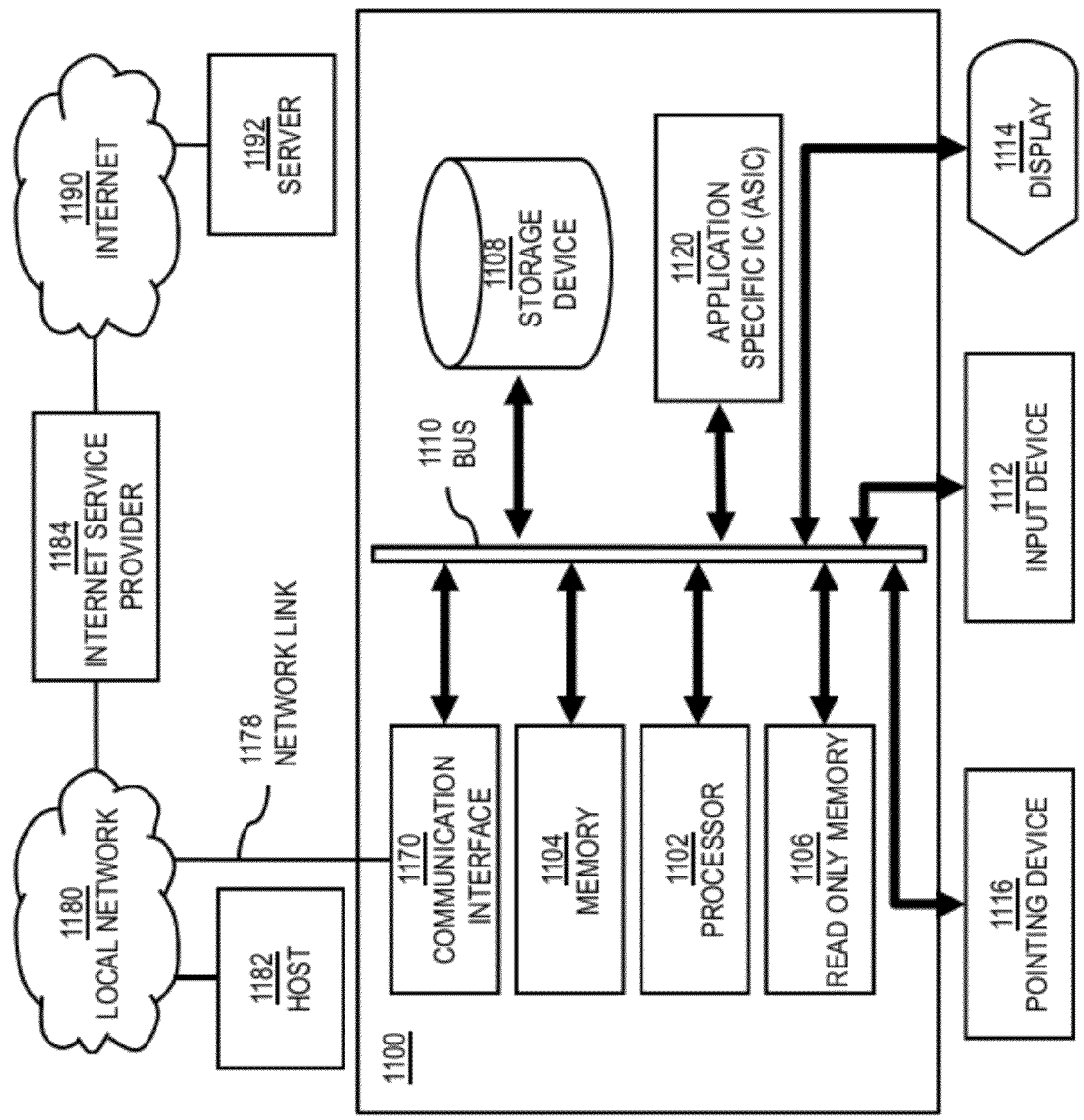
FIG. 11 is a diagram of hardware that can be used to implement an embodiment of the invention.

FIG. 11 illustrates a computer system 1100 upon which an embodiment of the invention may be implemented. Although computer system 1100 is depicted with respect to a particular device or equipment, it is contemplated that other devices or equipment (e.g., network elements, servers, etc.) within FIG. 11 can deploy the illustrated hardware and components of system 1100. Computer system 1100 is programmed (e.g., via computer program code or instructions) to recognize objects in media content as described herein and includes a communication mechanism such as a bus 1110 for passing information between other internal and external components of the computer system 1100. Information (also called data) is represented as a physical expression of a measurable phenomenon, typically electric voltages, but including, in other embodiments, such phenomena as magnetic, electromagnetic, pressure, chemical, biological, molecular, atomic, subatomic and quantum interactions. For example, north and south magnetic fields, or a zero and non-zero electric voltage, represent two states (0, 1) of a binary digit (bit). Other phenomena can represent digits of a higher base. A superposition of multiple simultaneous quantum states before measurement represents a quantum bit (qubit). A sequence of one or more digits constitutes digital data that is used to represent a number or code for a character. In some embodiments, information called analog data is represented by a near continuum of measurable values within a particular range. Computer system 1100, or a portion thereof, constitutes a means for performing one or more steps of recognizing objects in media content.

A bus 1110 includes one or more parallel conductors of information so that information is transferred quickly among devices coupled to the bus 1110. One or more processors 1102 for processing information are coupled with the bus 1110.

A processor (or multiple processors) 1102 performs a set of operations on information as specified by computer program code related to recognizing objects in media content. The computer program code is a set of instructions or statements providing instructions for the operation of the processor and/or the computer system to perform specified functions. The code, for example, may be written in a computer programming language that is compiled into a native instruction set of the processor. The code may also be written directly using the native instruction set (e.g., machine language). The set of operations include bringing information in from the bus 1110 and placing information on the bus 1110. The set of operations also typically include comparing two or more units of information, shifting positions of units of information, and combining two or more units of information, such as by addition or multiplication or logical operations like OR, exclusive OR (XOR), and AND. Each operation of the set of operations that can be performed by the processor is represented to the processor by information called instructions, such as an operation code of one or more digits. A sequence of operations to be executed by the processor 1102, such as a sequence of operation codes, constitute processor instructions, also called computer system instructions or, simply, computer instructions. Processors may be implemented as mechanical, electrical, magnetic, optical, chemical or quantum components, among others, alone or in combination.

Computer system 1100 also includes a memory 1104 coupled to bus 1110. The memory 1104, such as a random access memory (RAM) or any other dynamic storage device, stores information including processor instructions for recognizing objects in media content. Dynamic memory allows information stored therein to be changed by the computer system 1100. RAM allows a unit of information stored at a location called a memory address to be stored and retrieved independently of information at neighboring addresses. The memory 1104 is also used by the processor 1102 to store temporary values during execution of processor instructions. The computer system 1100 also includes a read only memory (ROM) 1106 or any other static storage device coupled to the bus 1110 for storing static information, including instructions, that is not changed by the computer system 1100. Some memory is composed of volatile storage that loses the information stored thereon when power is lost. Also coupled to bus 1110 is a non-volatile (persistent) storage device 1108, such as a magnetic disk, optical disk or flash card, for storing information, including instructions, that persists even when the computer system 1100 is turned off or otherwise loses power.

Information, including instructions for recognizing objects in media content, is provided to the bus 1110 for use by the processor from an external input device 1112, such as a keyboard containing alphanumeric keys operated by a human user, or a sensor. A sensor detects conditions in its vicinity and transforms those detections into physical expression compatible with the measurable phenomenon used to represent information in computer system 1100. Other external devices coupled to bus 1110, used primarily for interacting with humans, include a display device 1114, such as a cathode ray tube (CRT), a liquid crystal display (LCD), a light emitting diode (LED) display, an organic LED (OLED) display), a plasma screen, or a printer for presenting text or images, and a pointing device 1116, such as a mouse, a trackball, cursor direction keys, or a motion sensor, for controlling a position of a small cursor image presented on the display 1114 and issuing commands associated with graphical elements presented on the display 1114. In some embodiments, for example, in embodiments in which the computer system 1100 performs all functions automatically without human input, one or more of external input device 1112, display device 1114 and pointing device 1116 is omitted.

In the illustrated embodiment, special purpose hardware, such as an application specific integrated circuit (ASIC) 1120, is coupled to bus 1110. The special purpose hardware is configured to perform operations not performed by processor 1102 quickly enough for special purposes. Examples of ASICs include graphics accelerator cards for generating images for display 1114, cryptographic boards for encrypting and decrypting messages sent over a network, speech recognition, and interfaces to special external devices, such as robotic arms and medical scanning equipment that repeatedly perform some complex sequence of operations that are more efficiently implemented in hardware.

Computer system 1100 also includes one or more instances of a communications interface 1170 coupled to bus 1110. Communication interface 1170 provides a one-way or two-way communication coupling to a variety of external devices that operate with their own processors, such as printers, scanners and external disks. In general the coupling is with a network link 1178 that is connected to a local network 1180 to which a variety of external devices with their own processors are connected. For example, communication interface 1170 may be a parallel port or a serial port or a universal serial bus (USB) port on a personal computer. In some embodiments, communications interface 1170 is an integrated services digital network (ISDN) card or a digital subscriber line (DSL) card or a telephone modem that provides an information communication connection to a corresponding type of telephone line. In some embodiments, a communication interface 1170 is a cable modem that converts signals on bus 1110 into signals for a communication connection over a coaxial cable or into optical signals for a communication connection over a fiber optic cable. As another example, communications interface 1170 may be a local area network (LAN) card to provide a data communication connection to a compatible LAN, such as Ethernet. Wireless links may also be implemented. For wireless links, the communications interface 1170 sends or receives or both sends and receives electrical, acoustic or electromagnetic signals, including infrared and optical signals, that carry information streams, such as digital data. For example, in wireless handheld devices, such as mobile telephones like cell phones, the communications interface 1170 includes a radio band electromagnetic transmitter and receiver called a radio transceiver. In certain embodiments, the communications interface 1170 enables connection to the communication network 105 for recognizing objects in media content to the UE 101.

The term "computer-readable medium" as used herein refers to any medium that participates in providing information to processor 1102, including instructions for execution. Such a medium may take many forms, including, but not limited to computer-readable storage medium (e.g., non-volatile media, volatile media), and transmission media. Non-transitory media, such as non-volatile media, include, for example, optical or magnetic disks, such as storage device 1108. Volatile media include, for example, dynamic memory 1104. Transmission media include, for example, twisted pair cables, coaxial cables, copper wire, fiber optic cables, and carrier waves that travel through space without wires or cables, such as acoustic waves and electromagnetic waves, including radio, optical and infrared waves. Signals include man-made transient variations in amplitude, frequency, phase, polarization or other physical properties transmitted through the transmission media. Common forms of computer-readable media include, for example, a floppy disk, a flexible disk, hard disk, magnetic tape, any other magnetic medium, a CD-ROM, CDRW, DVD, any other optical medium, punch cards, paper tape, optical mark sheets, any other physical medium with patterns of holes or other optically recognizable indicia, a RAM, a PROM, an EPROM, a FLASH-EPROM, an EEPROM, a flash memory, any other memory chip or cartridge, a carrier wave, or any other medium from which a computer can read. The term computer-readable storage medium is used herein to refer to any computer-readable medium except transmission media.

Logic encoded in one or more tangible media includes one or both of processor instructions on a computer-readable storage media and special purpose hardware, such as ASIC 1120.

Network link 1178 typically provides information communication using transmission media through one or more networks to other devices that use or process the information. For example, network link 1178 may provide a connection through local network 1180 to a host computer 1182 or to equipment 1184 operated by an Internet Service Provider (ISP). ISP equipment 1184 in turn provides data communication services through the public, world-wide packet-switching communication network of networks now commonly referred to as the Internet 1190.

A computer called a server host 1192 connected to the Internet hosts a process that provides a service in response to information received over the Internet. For example, server host 1192 hosts a process that provides information representing video data for presentation at display 1114. It is contemplated that the components of system 1100 can be deployed in various configurations within other computer systems, e.g., host 1182 and server 1192.

At least some embodiments of the invention are related to the use of computer system 1100 for implementing some or all of the techniques described herein. According to one embodiment of the invention, those techniques are performed by computer system 1100 in response to processor 1102 executing one or more sequences of one or more processor instructions contained in memory 1104. Such instructions, also called computer instructions, software and program code, may be read into memory 1104 from another computer-readable medium such as storage device 1108 or network link 1178. Execution of the sequences of instructions contained in memory 1104 causes processor 1102 to perform one or more of the method steps described herein. In alternative embodiments, hardware, such as ASIC 1120, may be used in place of or in combination with software to implement the invention. Thus, embodiments of the invention are not limited to any specific combination of hardware and software, unless otherwise explicitly stated herein.

The signals transmitted over network link 1178 and other networks through communications interface 1170, carry information to and from computer system 1100. Computer system 1100 can send and receive information, including program code, through the networks 1180, 1190 among others, through network link 1178 and communications interface 1170. In an example using the Internet 1190, a server host 1192 transmits program code for a particular application, requested by a message sent from computer 1100, through Internet 1190, ISP equipment 1184, local network 1180 and communications interface 1170. The received code may be executed by processor 1102 as it is received, or may be stored in memory 1104 or in storage device 1108 or any other non-volatile storage for later execution, or both. In this manner, computer system 1100 may obtain application program code in the form of signals on a carrier wave.

Various forms of computer readable media may be involved in carrying one or more sequence of instructions or data or both to processor 1102 for execution. For example, instructions and data may initially be carried on a magnetic disk of a remote computer such as host 1182. The remote computer loads the instructions and data into its dynamic memory and sends the instructions and data over a telephone line using a modem. A modem local to the computer system 1100 receives the instructions and data on a telephone line and uses an infra-red transmitter to convert the instructions and data to a signal on an infra-red carrier wave serving as the network link 1178. An infrared detector serving as communications interface 1170 receives the instructions and data carried in the infrared signal and places information representing the instructions and data onto bus 1110. Bus 1110 carries the information to memory 1104 from which processor 1102 retrieves and executes the instructions using some of the data sent with the instructions. The instructions and data received in memory 1104 may optionally be stored on storage device 1108, either before or after execution by the processor 1102.

FIG. 12 illustrates a chip set or chip 1200 upon which an embodiment of the invention may be implemented. Chip set 1200 is programmed to recognize objects in media content as described herein and includes, for instance, the processor and memory components described with respect to FIG. 12 incorporated in one or more physical packages (e.g., chips). By way of example, a physical package includes an arrangement of one or more materials, components, and/or wires on a structural assembly (e.g., a baseboard) to provide one or more characteristics such as physical strength, conservation of size, and/or limitation of electrical interaction. It is contemplated that in certain embodiments the chip set 1200 can be implemented in a single chip. It is further contemplated that in certain embodiments the chip set or chip 1200 can be implemented as a single "system on a chip." It is further contemplated that in certain embodiments a separate ASIC would not be used, for example, and that all relevant functions as disclosed herein would be performed by a processor or processors. Chip set or chip 1200, or a portion thereof, constitutes a means for performing one or more steps of providing user interface navigation information associated with the availability of functions. Chip set or chip 1200, or a portion thereof, constitutes a means for performing one or more steps of recognizing objects in media content.

In one embodiment, the chip set or chip 1200 includes a communication mechanism such as a bus 1201 for passing information among the components of the chip set 1200. A processor 1203 has connectivity to the bus 1201 to execute instructions and process information stored in, for example, a memory 1205. The processor 1203 may include one or more processing cores with each core configured to perform independently. A multi-core processor enables multiprocessing within a single physical package. Examples of a multi-core processor include two, four, eight, or greater numbers of processing cores. Alternatively or in addition, the processor 1203 may include one or more microprocessors configured in tandem via the bus 1201 to enable independent execution of instructions, pipelining, and multithreading. The processor 1203 may also be accompanied with one or more specialized components to perform certain processing functions and tasks such as one or more digital signal processors (DSP) 1207, or one or more application-specific integrated circuits (ASIC) 1209. A DSP 1207 typically is configured to process real-world signals (e.g., sound) in real time independently of the processor 1203. Similarly, an ASIC 1209 can be configured to performed specialized functions not easily performed by a more general purpose processor. Other specialized components to aid in performing the inventive functions described herein may include one or more field programmable gate arrays (FPGA) (not shown), one or more controllers (not shown), or one or more other special-purpose computer chips.

In one embodiment, the chip set or chip 1200 includes merely one or more processors and some software and/or firmware supporting and/or relating to and/or for the one or more processors.

The processor 1203 and accompanying components have connectivity to the memory 1205 via the bus 1201. The memory 1205 includes both dynamic memory (e.g., RAM, magnetic disk, writable optical disk, etc.) and static memory (e.g., ROM, CD-ROM, etc.) for storing executable instructions that when executed perform the inventive steps described herein to recognize objects in media content. The memory 1205 also stores the data associated with or generated by the execution of the inventive steps.

Figure 13:
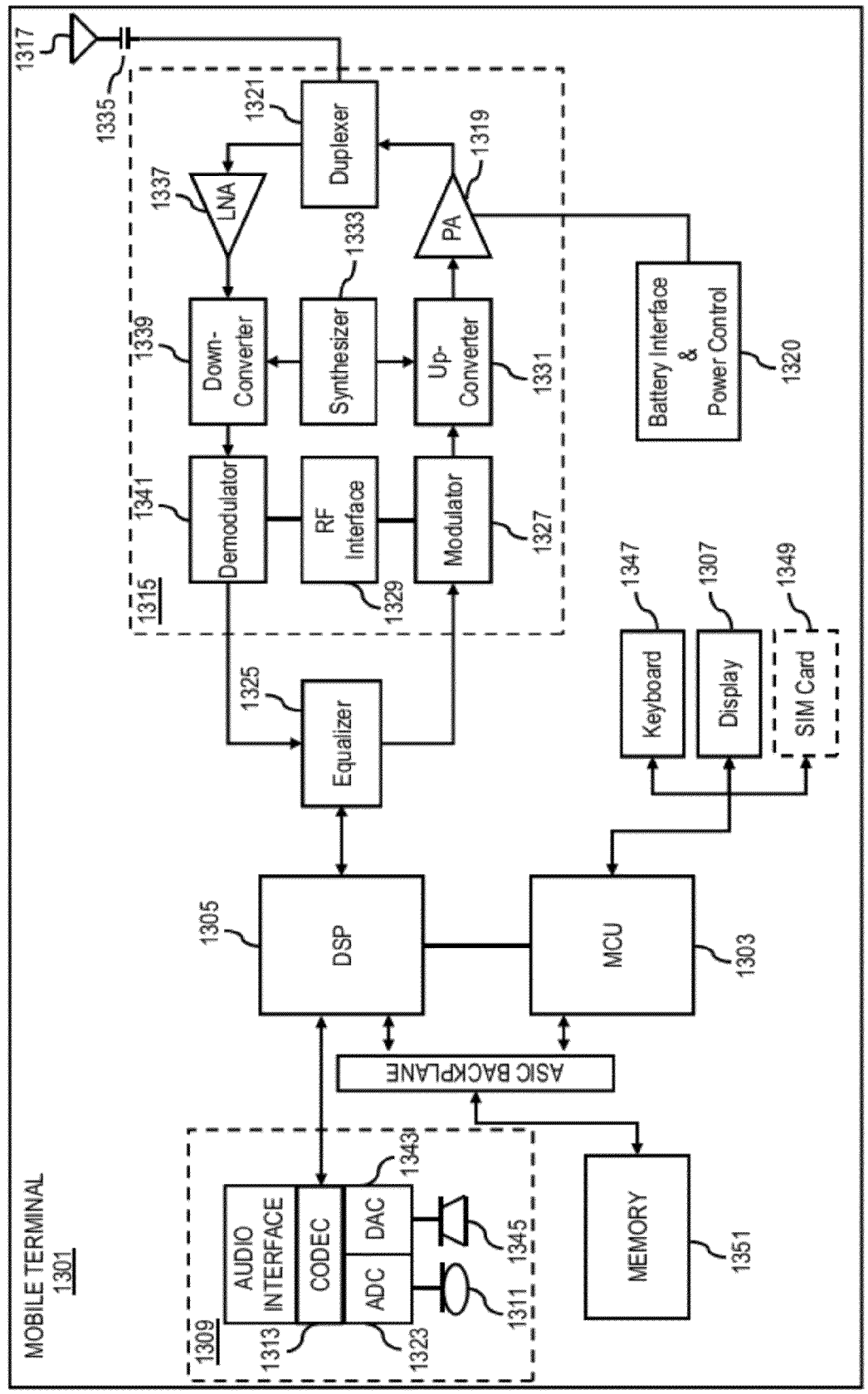
FIG. 13 is a diagram of a mobile terminal (e.g., handset) that can be used to implement an embodiment of the invention.

FIG. 13 is a diagram of exemplary components of a mobile terminal (e.g., handset) for communications, which is capable of operating in the system of FIG. 1, according to one embodiment. In some embodiments, mobile terminal 1301, or a portion thereof, constitutes a means for performing one or more steps of recognizing objects in media content. Generally, a radio receiver is often defined in terms of front-end and back-end characteristics. The front-end of the receiver encompasses all of the Radio Frequency (RF) circuitry whereas the back-end encompasses all of the base-band processing circuitry. As used in this application, the term "circuitry" refers to both: (1) hardware-only implementations (such as implementations in only analog and/or digital circuitry), and (2) to combinations of circuitry and software (and/or firmware) (such as, if applicable to the particular context, to a combination of processor(s), including digital signal processor(s), software, and memory(ies) that work together to cause an apparatus, such as a mobile phone or server, to perform various functions). This definition of "circuitry" applies to all uses of this term in this application, including in any claims. As a further example, as used in this application and if applicable to the particular context, the term "circuitry" would also cover an implementation of merely a processor (or multiple processors) and its (or their) accompanying software/or firmware. The term "circuitry"

would also cover if applicable to the particular context, for example, a baseband integrated circuit or applications processor integrated circuit in a mobile phone or a similar integrated circuit in a cellular network device or other network devices.

Pertinent internal components of the telephone include a Main Control Unit (MCU) 1303, a Digital Signal Processor (DSP) 1305, and a receiver/transmitter unit including a microphone gain control unit and a speaker gain control unit. A main display unit 1307 provides a display to the user in support of various applications and mobile terminal functions that perform or support the steps of recognizing objects in media content. The display 1307 includes display circuitry configured to display at least a portion of a user interface of the mobile terminal (e.g., mobile telephone). Additionally, the display 1307 and display circuitry are configured to facilitate user control of at least some functions of the mobile terminal. An audio function circuitry 1309 includes a microphone 1311 and microphone amplifier that amplifies the speech signal output from the microphone 1311. The amplified speech signal output from the microphone 1311 is fed to a coder/decoder (CODEC) 1313.

A radio section 1315 amplifies power and converts frequency in order to communicate with a base station, which is included in a mobile communication system, via antenna 1317. The power amplifier (PA) 1319 and the transmitter/modulation circuitry are operationally responsive to the MCU 1303, with an output from the PA 1319 coupled to the duplexer 1321 or circulator or antenna switch, as known in the art. The PA 1319 also couples to a battery interface and power control unit 1320.

In use, a user of mobile terminal 1301 speaks into the microphone 1311 and his or her voice along with any detected background noise is converted into an analog voltage. The analog voltage is then converted into a digital signal through the Analog to Digital Converter (ADC) 1323. The control unit 1303 routes the digital signal into the DSP 1305 for processing therein, such as speech encoding, channel encoding, encrypting, and interleaving. In one embodiment, the processed voice signals are encoded, by units not separately shown, using a cellular transmission protocol such as enhanced data rates for global evolution (EDGE), general packet radio service (GPRS), global system for mobile communications (GSM), Internet protocol multimedia subsystem (IMS), universal mobile telecommunications system (UMTS), etc., as well as any other suitable wireless medium, e.g., microwave access (WiMAX), Long Term Evolution (LTE) networks, code division multiple access (CDMA), wideband code division multiple access (WCDMA), wireless fidelity (WiFi), satellite, and the like, or any combination thereof.

The encoded signals are then routed to an equalizer 1325 for compensation of any frequency-dependent impairments that occur during transmission though the air such as phase and amplitude distortion. After equalizing the bit stream, the modulator 1327 combines the signal with a RF signal generated in the RF interface 1329. The modulator 1327 generates a sine wave by way of frequency or phase modulation. In order to prepare the signal for transmission, an up-converter 1331 combines the sine wave output from the modulator 1327 with another sine wave generated by a synthesizer 1333 to achieve the desired frequency of transmission. The signal is then sent through a PA 1319 to increase the signal to an appropriate power level. In practical systems, the PA 1319 acts as a variable gain amplifier whose gain is controlled by the DSP 1305 from information received from a network base station. The signal is then filtered within the duplexer 1321 and optionally sent to an antenna coupler 1335 to match impedances to provide maximum power transfer. Finally, the signal is transmitted via antenna 1317 to a local base station. An automatic gain control (AGC) can be supplied to control the gain of the final stages of the receiver. The signals may be forwarded from there to a remote telephone which may be another cellular telephone, any other mobile phone or a landline connected to a Public Switched Telephone Network (PSTN), or other telephony networks.

Voice signals transmitted to the mobile terminal 1301 are received via antenna 1317 and immediately amplified by a low noise amplifier (LNA) 1337. A down-converter 1339 lowers the carrier frequency while the demodulator 1341 strips away the RF leaving only a digital bit stream. The signal then goes through the equalizer 1325 and is processed by the DSP 1305. A Digital to Analog Converter (DAC) 1343 converts the signal and the resulting output is transmitted to the user through the speaker 1345, all under control of a Main Control Unit (MCU) 1303 which can be implemented as a Central Processing Unit (CPU) (not shown).

The MCU 1303 receives various signals including input signals from the keyboard 1347. The keyboard 1347 and/or the MCU 1303 in combination with other user input components (e.g., the microphone 1311) comprise a user interface circuitry for managing user input. The MCU 1303 runs a user interface software to facilitate user control of at least some functions of the mobile terminal 1301 to recognize objects in media content. The MCU 1303 also delivers a display command and a switch command to the display 1307 and to the speech output switching controller, respectively. Further, the MCU 1303 exchanges information with the DSP 1305 and can access an optionally incorporated SIM card 1349 and a memory 1351. In addition, the MCU 1303 executes various control functions required of the terminal. The DSP 1305 may, depending upon the implementation, perform any of a variety of conventional digital processing functions on the voice signals. Additionally, DSP 1305 determines the background noise level of the local environment from the signals detected by microphone 1311 and sets the gain of microphone 1311 to a level selected to compensate for the natural tendency of the user of the mobile terminal 1301.

The CODEC 1313 includes the ADC 1323 and DAC 1343. The memory 1351 stores various data including call incoming tone data and is capable of storing other data including music data received via, e.g., the global Internet. The software module could reside in RAM memory, flash memory, registers, or any other form of writable storage medium known in the art. The memory device 1351 may be, but not limited to, a single memory, CD, DVD, ROM, RAM, EEPROM, optical storage, magnetic disk storage, flash memory storage, or any other non-volatile storage medium capable of storing digital data.

An optionally incorporated SIM card 1349 carries, for instance, important information, such as the cellular phone number, the carrier supplying service, subscription details, and security information. The SIM card 1349 serves primarily to identify the mobile terminal 1301 on a radio network. The card 1349 also contains a memory for storing a personal telephone number registry, text messages, and user specific mobile terminal settings.

While the invention has been described in connection with a number of embodiments and implementations, the invention is not so limited but covers various obvious modifications and equivalent arrangements, which fall within the purview of the appended claims. Although features of the invention are expressed in certain combinations among the claims, it is contemplated that these features can be arranged in any combination and order.

What is claimed is:

1. A method comprising:
   determining to detect, at a device, one or more objects in a content stream;
   determining, by a processor, to capture one or more representations of the one or more objects in the content stream; and
   associating the one or more representations with one or more instances of the content stream,
   wherein one or more of the one or more objects are detected at least before the one or more instances of the content stream are captured.

2. A method of claim 1, further comprising:
   determining to capture one or more other representations of the one or more objects in the content stream;
   selecting either the one or more representations or the one or more other representations to associate with the one or more instances based, at least in part, on one or more criteria.

3. A method of claim 2, wherein the one or more representations or the one or more other representations are captured continuously, periodically, or at a predetermined schedule until either the one or more representations or the one or more other representations meet a predetermined quality threshold.

4. A method of claim 1, further comprising:
   determining recognition information of the one or more objects based, at least in part, on the one or more representations; and
   associating the recognition information with the one or more instances.

5. A method of claim 4, wherein the determination of the recognition information is further based, at least in part, on resources available at the device, another device, a server, a network component, or a combination thereof.

6. A method of claim 1, wherein the associating of the one or more representations comprises:
   determining to store the one or more representations as metadata in the one or more instances, as metadata in a storage linked to the one or more instances, or a combination thereof.

7. A method of claim 1, further comprising:
   associating the one or more representations with respective time stamps; and
   associating the one or more representations with the one or more other instances based, at least in part, on the time stamps.

8. A method of claim 1, further comprising:
   receiving at least one of the one or more representations from one or more other devices, one or more other content streams, or a combination thereof.

9. A method of claim 1, wherein the one or more representations correspond to one or more characteristics of the one or more objects.

10. A method of claim 1, further comprising:
    determining tracking information of the one or more detected objects,
    wherein the content stream is a live video stream, and the one or more instances are images, videos, audio recordings, or a combination thereof, and the tracking information includes information identifying at least a relative position of the object within the captured one or more instances.

11. An apparatus comprising:
    at least one processor; and
    at least one memory including computer program code for one or more programs,
    the at least one memory and the computer program code configured to, with the at least one processor, cause the apparatus to perform at least the following,
    determine to detect, at a device, one or more objects in a content stream;
    determine to capture one or more representations of the one or more objects in the content stream; and
    associate the one or more representations with one or more instances of the content stream,
    wherein one or more of the one or more objects are detected at least before the one or more instances of the content stream are captured.

12. An apparatus of claim 11, wherein the apparatus is further caused to:
    determine to capture one or more other representations of the one or more objects in the content stream;
    select either the one or more representations or the one or more other representations to associate with the one or more instances based, at least in part, on one or more criteria.

13. An apparatus of claim 12, wherein the one or more representations or the one or more other representations are captured continuously, periodically, or at a predetermined schedule until either the one or more representations or the one or more other representations meet a predetermined quality threshold.

14. An apparatus of claim 11, wherein the apparatus is further caused to:
    determining recognition information of the one or more objects based, at least in part, on the one or more representations; and
    associating the recognition information with the one or more instances.

15. An apparatus of claim 14, wherein the determination of the recognition information is further based, at least in part, on resources available at the device, another device, a server, a network component, or a combination thereof.

16. An apparatus of claim 11, wherein the associating of the one or more representations comprises:
    determining to store the one or more representations as metadata in the one or more instances, as metadata in a storage linked to the one or more instances, or a combination thereof.

17. An apparatus of claim 11, wherein the apparatus is further caused to:
    associating the one or more representations with respective time stamps; and
    associating the one or more representations with the one or more other instances based, at least in part, on the time stamps.

18. An apparatus of claim 11, wherein the apparatus is further caused to:
    receiving at least one of the one or more representations from one or more other devices, one or more other content streams, or a combination thereof.

19. An apparatus of claim 11, wherein the one or more representations are captured before, after, and/or while the one or more instances of the content stream are captured, and wherein the one or more representations correspond to one or more characteristics of the one or more objects.

20. An apparatus of claim 11, wherein the content stream is a live video stream, and the one or more instances are images, videos, audio recordings, or a combination thereof.

* * * * *